(12) United States Patent
Mutsuo

(10) Patent No.: US 8,358,443 B2
(45) Date of Patent: Jan. 22, 2013

(54) IMAGE FORMING APPARATUS, IMAGE FORMING METHOD, AND PROGRAM

(75) Inventor: Tae Mutsuo, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 12/467,635

(22) Filed: May 18, 2009

(65) Prior Publication Data
US 2009/0290196 A1 Nov. 26, 2009

(30) Foreign Application Priority Data

May 23, 2008 (JP) .................................. 2008-135609

(51) Int. Cl.
*G06K 15/00* (2006.01)
(52) U.S. Cl. ...................................................... 358/3.06
(58) Field of Classification Search .................. 358/3.06
See application file for complete search history.

(56) References Cited

U.S. PATENT DOCUMENTS

| | | | |
|---|---|---|---|
| 7,372,594 B1 | 5/2008 | Kusakabe et al. ............... | 358/1.9 |
| 7,876,473 B2 * | 1/2011 | Yamamoto ..................... | 358/1.9 |
| 2004/0150846 A1 * | 8/2004 | Jeong .............................. | 358/1.9 |
| 2004/0155916 A1 * | 8/2004 | Uchiyama et al. .............. | 347/15 |
| 2007/0115490 A1 * | 5/2007 | Yada ............................. | 358/1.13 |

FOREIGN PATENT DOCUMENTS

| | | |
|---|---|---|
| JP | 2001-103285 | 4/2001 |
| JP | 2002-202650 | 7/2002 |

\* cited by examiner

*Primary Examiner* — Saeid Ebrahimi Dehkordy
(74) *Attorney, Agent, or Firm* — Fitzpatrick, Cella, Harper & Scinto

(57) ABSTRACT

The image forming apparatus includes a halftone processing section that executes halftone processing having a halftone processing period, a signal add-on section that adds the add-on signals on the input image signals subjected to the halftone processing, a position information acquisition section that acquires position information to determine a relative position of halftone dots by the halftone processing and the add-on signals in a first image area, the first image area is based on a common multiple of the halftone processing period and a minimum interval of the add-on dots, and the position information preventing the add-on signals added by the signal add-on section from crossing over the halftone dots, and an add-on control section that continues or repeats add-on control processing of the add-on signals, executed based on the acquired position information, in a second image area based on the common multiple and consecutive from the first image area.

13 Claims, 19 Drawing Sheets

FIG. 9

| p(0,0) | p(0,1) | p(0,2) | p(0,3) | p(0,4) |
|---|---|---|---|---|
| p(1,0) | p(1,1) | p(1,2) | p(1,3) | p(1,4) |
| p(2,0) | p(2,1) | p(2,2) | p(2,3) | p(2,4) |
| p(3,0) | p(3,1) | p(3,2) | p(3,3) | p(3,4) |
| p(4,0) | p(4,1) | p(4,2) | p(4,3) | p(4,4) |

FIG. 10

| p(0,0) | p(0,1) | p(0,2) | p(0,3) | p(0,4) |
|---|---|---|---|---|
| p(1,0) | p(1,1) | p(1,2) | p(1,3) | p(1,4) |
| p(2,0) | p(2,1) | p(2,2) | p(2,3) | p(2,4) |
| p(3,0) | p(3,1) | p(3,2) | p(3,3) | p(3,4) |
| p(4,0) | p(4,1) | p(4,2) | p(4,3) | p(4,4) |

IMAGE FORMING APPARATUS, IMAGE FORMING METHOD, AND PROGRAM

BACKGROUND OF THE INVENTION

1. Field of the Invention

The present invention relates to an image forming apparatus such as a printer and a copy machine, an image forming method, and a program, and particularly, to an image forming apparatus that provides predetermined add-on signals to image signals.

2. Description of the Related Art

In recent years, the performance of an image forming apparatus, such as a color printer and a color copying machine, has improved, and a high-quality image can be formed. Under the circumstances, images similar to paper currencies, banknotes, and securities can be formed, and problems of forgery of paper currencies and securities as well as copyright infringement may increase in the future.

The following example is known as a control measure for the problems. The technique is a signal add-on system for adding add-on signals which form information related to an image forming apparatus, such as tracking information of a serial number, to a color image formed by the image forming apparatus, the add-on signals being hard to be identified by human eyes (for example, see Japanese Patent Application Laid-Open No. 2002-202650). In the system, when faked paper currencies are discovered, an analysis apparatus that analyzes the tracking information can specify the image forming apparatus that has forged paper currencies based on the add-on signals formed on the paper currencies.

The add-on signals are usually added to the entire image. To add add-on signals to, for example, a color image constituted by yellow, magenta, cyan, and black planes to make the add-on signals hard for the human eyes to identify, the add-on signals are usually added only to the yellow plane having low visibility.

Adding the add-on signals to the color image allows one to extract the add-on signals from the image and restore the tracking information, when an image prohibited from being formed or a copied image prohibited from being copied is discovered. As a result, the image forming apparatus that has formed the image can be specified.

The add-on signals are added to all output images regardless of whether the image formation or copying is prohibited or not prohibited. Meanwhile, the image forming apparatus usually executes halftone processing (halftone processing), and halftone dots are formed by the halftone processing based on input image data.

Under the circumstances, Japanese Patent Application Laid-Open No. 2001-103285 discloses a technology for making an image visually less uncomfortable by off-dotting adjacent pixels upon the addition of an add-on signal, if there is an image adjacent to the add-on position.

However, the positional relationship between the halftone dots and the add-on signals changes according to the relationship between the period of the formed halftone dots and the add-on period of the add-on signals in Japanese Patent Application Laid-Open No. 2002-202650. As a result, the distinction between the halftone dots and the add-on signals is difficult in areas where the halftone dots overlap the add-on signals, causing a problem in which the detection accuracy of the add-on signals is significantly degraded. Meanwhile, there is a problem that the add-on signals are combined with the halftone dots in the areas where the halftone dots and the add-on signals are adjacent to each other, when the size of the add-on signals is made large enough to prevent the foregoing problem, and the add-on signals are easily spotted, resulting in degradation of the image quality.

Japanese Patent Application Laid-Open No. 2001-103285 is significantly useful in that visually less uncomfortable add-on signals can be add-on. However, there is a problem that the processing load for off-dotting the pixels adjacent to the add-on signals is heavy, because the normal image signals and the add-on signals are asynchronous.

Because of these factors, an image forming apparatus that can add add-on signals at appropriate positions with less processing load is desired.

SUMMARY OF THE INVENTION

A purpose of the invention is to provide an image forming apparatus that forms an image on a recording medium, based on image signals on which add-on signals are added, wherein the add-on signals being adapted to form add-on dots read by an analysis device that analyzes tracking information, including halftone processing section that executes halftone processing having a halftone processing period, to input image signals, signal add-on section that adds the add-on signals on the input image signals subjected to the halftone processing by the halftone processing section, position information acquisition section that acquires position information to determine a relative position of halftone dots by the halftone processing and the add-on signals in a first image area, the first image area is based on a common multiple of the halftone processing period and a minimum interval of the add-on dots formed by the add-on signals, and the position information preventing the add-on signals added by the signal add-on section from crossing over the halftone dots generated by the halftone processing section, and add-on control section that continues or repeats add-on control processing of the add-on signals, executed by the signal add-on section based on the acquired position information, in a second image area which is based on the common multiple and consecutive from the first image area.

Another purpose of the invention is to provide an image forming method in an image forming apparatus that forms an image on a recording medium, based on image signals on which add-on signals are added, wherein the add-on signals being adapted to form add-on dots read by an analysis device that analyzes tracking information, including steps of executing halftone processing having a halftone processing period, to input image signals, adding the add-on signals on the input image signals subjected to the halftone processing, acquiring position information to determine a relative position of halftone dots by the halftone processing and the add-on signals in a first image area, the first image area is based on a common multiple of the halftone processing period and a minimum interval of the add-on dots formed by the add-on signals, and the position information preventing the add-on signals added in the step of adding add-on signals from crossing over the halftone dots generated by the halftone processing, and continuing or repeating add-on control processing of the add-on signals, executed in the first image area based on the acquired position information, in a second image area which is based on the common multiple and consecutive form the first image area.

A further purpose of the present invention will become apparent from the following detailed description of exemplary embodiments with reference to the add-on drawings.

BRIEF DESCRIPTION OF THE DRAWINGS

FIG. 9 is a view for describing add-on option positions according to an embodiment.

FIG. 10 illustrates an add-on pattern according to an embodiment.

DESCRIPTION OF THE EMBODIMENTS

Preferred embodiments of the present invention will now be illustrated. The individual embodiments described below will be helpful in understanding a variety of concepts of the present invention from the generic to the more specific. Further, the technical scope of the present invention is defined by the claims, and is not limited by the following individual embodiments.

Exemplary embodiments of the invention will now be illustratively described in detail with reference to the drawings. However, the constituent elements described in the embodiments are illustrative only and are not intended to limit the scope of the invention to the exemplary embodiments.

<Schematic Cross-Sectional View of Color Image Forming Apparatus>

Figure 1:
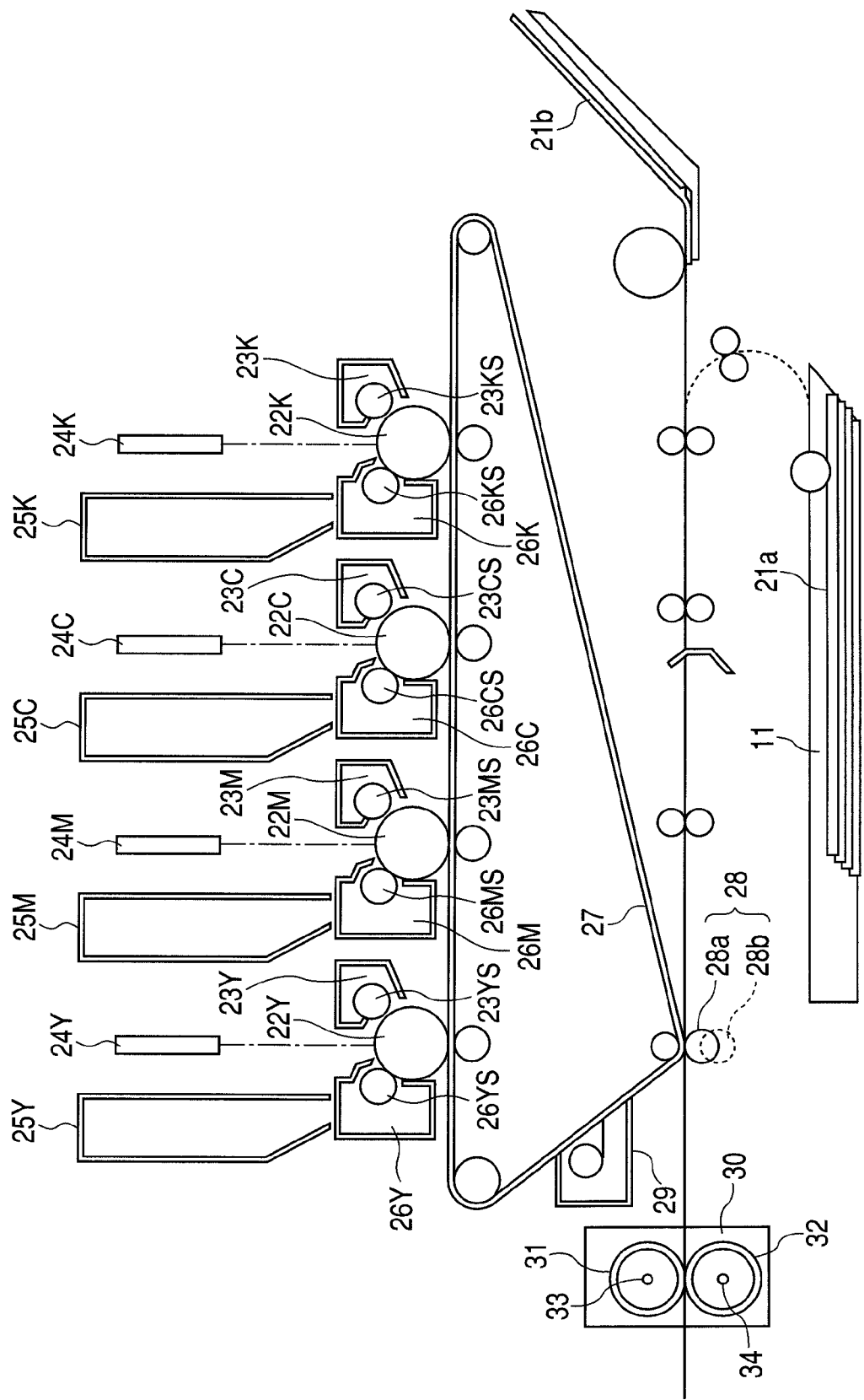
FIG. 1 is a schematic cross-sectional view of a color image forming apparatus according to an embodiment.

A first exemplary embodiment will be described as follows. FIG. 1 illustrates an example of an electrophotographic color image forming apparatus according to the present embodiment. FIG. 1 is a schematic cross-sectional view of a tandem color image forming apparatus adopting an intermediate transfer belt 27 as an intermediate transfer member.

An operation of an image forming portion in the color image forming apparatus according to the present embodiment will be described.

Exposure light that is converted from input image data (input image signal) and that is turned on based on the exposure time first forms electrostatic latent images on photoreceptors. The electrostatic latent images are developed to form monochromatic toner images, and then the monochromatic toner images are superimposed to form a multicolor toner image. The generated multicolor toner image is transferred to recording paper 11 as a recording medium (on the recording medium), and the multicolor toner image is fixed on the recording paper 11.

The image forming portion is constituted by paper feeding portions 21a and 21b, photosensitive drums 22Y to 22K, charge injection portions 23Y to 23K, toner cartridges 25Y to 25K, developing portions 26Y to 26K, an intermediate transfer belt 27, a transfer roller 28, and a fixing portion 30. For example, "photosensitive drums 22Y to 22K" is an abbreviation of "photosensitive drums 22Y, 22M, 22C, and 22K".

The photosensitive drums 22Y, 22M, 22C, and 22K as image carriers are respectively arranged on stations juxtaposed for developing colors yellow (Y), magenta (M), cyan (C), and black (K). The photosensitive drums 22Y to 22K are formed by applying organic photoconductive layers on the peripheries of aluminum cylinders and are rotated by transmission of driving force of a drive motor not shown. The drive motor rotates the photosensitive drums 22Y to 22K counterclockwise according to the image forming operation.

The charge injection portions 23Y, 23M, 23C, and 23K as primary charging means are respectively arranged on the stations and uniformly charge the surfaces of the yellow (Y), magenta (M), cyan (C), and black (K) photosensitive drums 22Y to 22K. Sleeves 23YS, 23MS, 23CS, and 23KS are arranged on the charge injection portions 23Y to 23K, respectively.

Exposure light based on input image data from the scanner portions 24Y, 24M, 24C, and 24K as exposure means is sent to the photosensitive drums 22Y to 22K and selectively exposes the surfaces of the photosensitive drums 22Y to 22K.

As a result, electrostatic latent images based on the image data are formed on the surfaces of the photosensitive drums 22Y to 22K.

The developing portions 26Y, 26M, 26C, and 26K as developing means are arranged on the stations, respectively. The developing portions 26Y to 26K respectively use yellow (Y), magenta (M), cyan (C), and black (K) toners as developing materials to visualize the electrostatic latent images formed on the surfaces of the photosensitive drums 22Y to 22K as monochromatic toner images. The developing portions 26Y to 26K include toner cartridges 25Y, 25M, 25C, and 25K for supplying color toners to the developing portions 26Y to 26K, respectively. Sleeves 26YS, 26MS, 26CS, and 26KS are arranged on the developing portions 26Y to 26K, respectively. The developing portions 26Y to 26K are detachably add-on to the color image forming apparatus.

The intermediate transfer belt 27 as an intermediate transfer member is contiguous with the photosensitive drums 22Y to 22K and rotates clockwise along with the rotations of the photosensitive drums 22Y to 22K during the image formation. The monochromatic toner images formed on the surfaces of the photosensitive drums 22Y to 22K are superimposed and transferred onto the intermediate transfer belt 27, and a multicolor toner image is formed.

The transfer roller 28 as transfer means then makes contact with the intermediate transfer belt 27 to sandwich and transfer the recording paper 11 transferred from the paper feeding portions 21a and 21b, and the multicolor toner image on the intermediate transfer belt 27 is transferred to the recording paper 11. The transfer roller 28 can make contact with (position of 28a) and separate from (position of 28b) the intermediate transfer belt 27. The transfer roller 28 makes contact with the recording paper 11 at the position of 28a when the multicolor toner image is transferred onto the recording paper 11 and separates from the recording paper 11 to the position of 28b after the image forming process.

The fixing portion 30 as fixing means melts and fixes the multicolor toner image transferred onto the recording paper 11, while carrying the recording paper 11. The fixing portion 30 includes a fixing roller 31 that heats the recording paper 11 and a pressure roller 32 that pressures the recording paper 11 to the fixing roller 31. The fixing roller 31 and the pressure roller 32 are made hollow and include heaters 33 and 34 inside, respectively. The recording paper 11 holding the multicolor toner image is transferred by the fixing roller 31 and the pressure roller 32 and is applied with heat and pressure, and the toners are fixed to the surface of the recording paper 11.

A discharge roller not shown discharges the recording paper 11 fixed with the multicolor toner image to a discharge tray not shown, and the image forming operation ends.

The cleaner 29 as cleaning means cleans the toner remaining on the intermediate transfer belt 27. A cleaner container of the cleaner 29 stores the waste toner after the four-color multicolor toner image formed on the intermediate transfer belt 27 is transferred to the recording paper 11.

<Functional Block Diagram of Color Image Forming Apparatus>

Figure 2A:
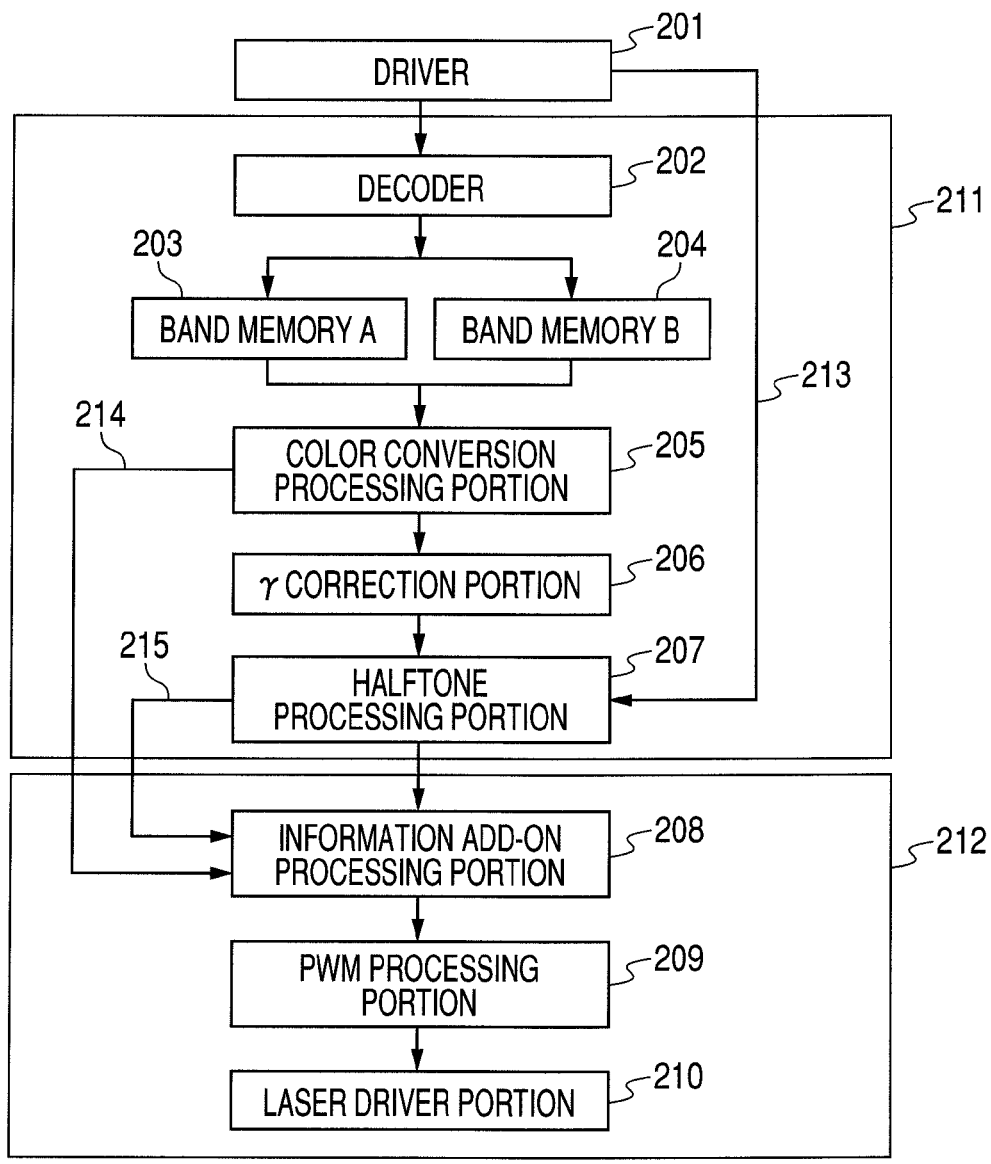
FIG. 2A is a block diagram of a signal processing configuration according to an embodiment.

A configuration of signal processing according to the present embodiment will now be described with reference to FIG. 2A. FIG. 2A is a block diagram of a signal processing configuration in the color image forming apparatus according to the present embodiment.

For example, when a host computer not shown issues a print command, a driver 201 on the host computer sends out a page description language as print data and inputs the page description language into a controller 211 in the color image forming apparatus. The page description language includes bit map data when a bit map image is output. The color image forming apparatus may include an image reading portion and an operation portion not shown, and the operation portion may issue the print command, while the image reading portion sends out image information as print data.

Upon printing, the user designates attributes of the image such as a document image, a graphic image, and a photographic image, or the attributes are automatically discriminated by an application to determine the attributes of the print data printed by the driver 201. The attributes are input as attribute information 213 to a halftone processing portion 207 as halftone processing means.

A decoder 202, a band memory A 203, a band memory B 204, a color conversion processing portion 205, a γ correction portion 206, and the halftone processing portion 207 are arranged inside the controller 211. The decoder 202 interprets input print data (for example, a page description language) and converts the data to RGB image data, 8 bits each. The RGB image data is input to the band memories. The band memories are constituted by two memories: the band memory A 203 and the band memory B 204. One memory can store several lines of image data.

Image areas of first predetermined lines are developed to the band memory A 203, and RGB image data is output from the band memory A 203 while image areas of the next predetermined lines are developed to the band memory B 204. RGB image data is output from the band memory B 204 while the following image areas of predetermined lines are developed to the band memory A 203. In this way, two band memories alternately develop and output image data.

The RGB image data output from the band memory A 203 and the band memory B 204 is input to the color conversion processing portion 205 in parallel. Predetermined color conversion processing and UCR (Under Color Removal) processing are applied to the RGB image data input to the color conversion processing portion 205, and the RGB image data is converted to Y (yellow), M (magenta), C (cyan), and K (black) image signals. As described, the color image forming apparatus of the present embodiment forms Y, M, C, and K screens, one screen for each color. Therefore, the color conversion processing portion 205 outputs, in a frame sequential manner, image signals in order of data of one screen of Y, data of one screen of M, data of one screen of C, and data of one screen of K, with time intervals between the data. The color conversion processing portion 205 further sends a color designation signal 214 to an engine 212 to notify the currently output color.

The γ correction portion 206 corrects the image signals of each color output from the color conversion processing portion 205 to make the output density curve optimal, and the halftone processing portion 207 executes halftone processing by a systematic dither method or other methods.

An information add-on processing portion 208, a PWM (Pulse Width Modulation) processing portion 209, and a laser driver portion 210 are arranged inside the engine 212. The information add-on processing portion 208 adds tracking information to the image signals, which are supplied from the controller 211 as a supplier and to which the halftone processing portion 207 has applied the halftone processing. The PWM processing portion 209 then applies a pulse width modulation and a D/A (digital-analog) conversion to the image signals, which are then input to the laser driver portion 210 and printed on the recording paper 11.

<Description of Halftone Processing>

The halftone processing by the halftone processing portion 207 according to the present embodiment will now be described. A unique ID of the image forming apparatus will be add-on as predetermined tracking information in the present embodiment.

Figure 2B:
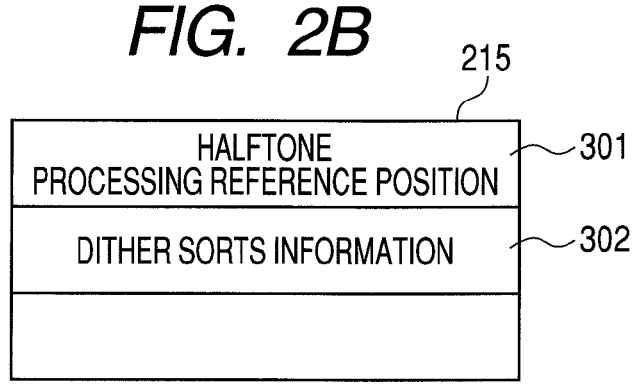
FIG. 2B illustrates halftone information according to an embodiment.

The halftone processing portion 207 stores two types of dither tables (a plurality of different halftone processing): a dither A and a dither B. The dither A is a dither for documents and graphic images, and the dither B is a dither for photographic images. Based on the input attribute information 213, the halftone processing portion 207 selects the dither A if the attribute information 213 indicates documents or graphic images and selects the dither B if the attribute information 213 indicates photographic images. The halftone processing portion 207 uses the selected dither table to execute the halftone processing. The halftone processing portion 207 also sends halftone information 215 illustrated in FIG. 2B to the engine 212. In other words, the engine 212 acquires the halftone information 215. The halftone information 215 includes a halftone processing reference position 301 indicating from where in the image signals the halftone processing is started and dither sort information 302 indicating which of the dither A and the dither B is selected. As described in detail below, the halftone processing reference position 301 functions as position information for determining the relative position of the add-on signals to halftone dots.

Figure 3:
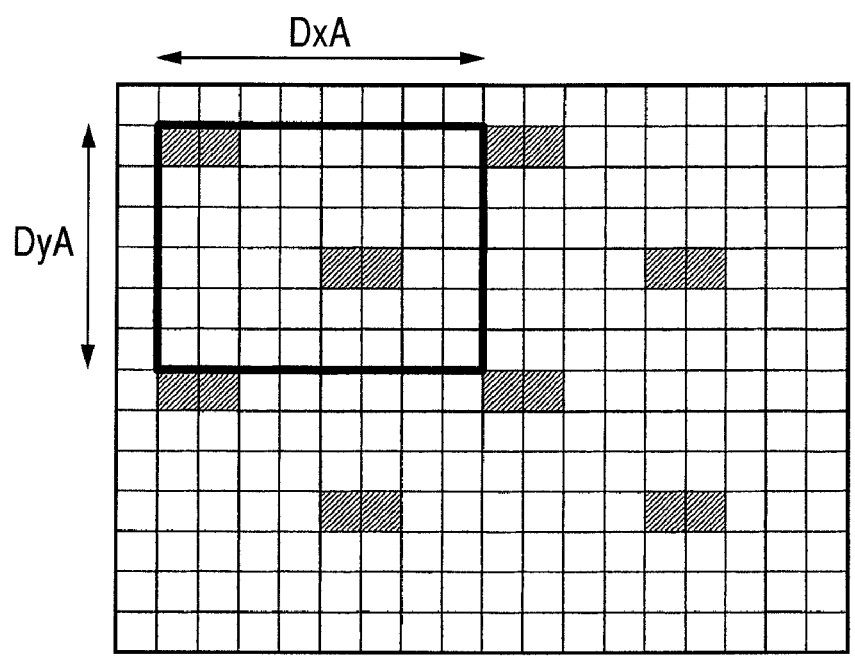
FIG. 3 illustrates a state of halftone dots as a result of halftone processing using a dither A according to an embodiment.
Figure 4:
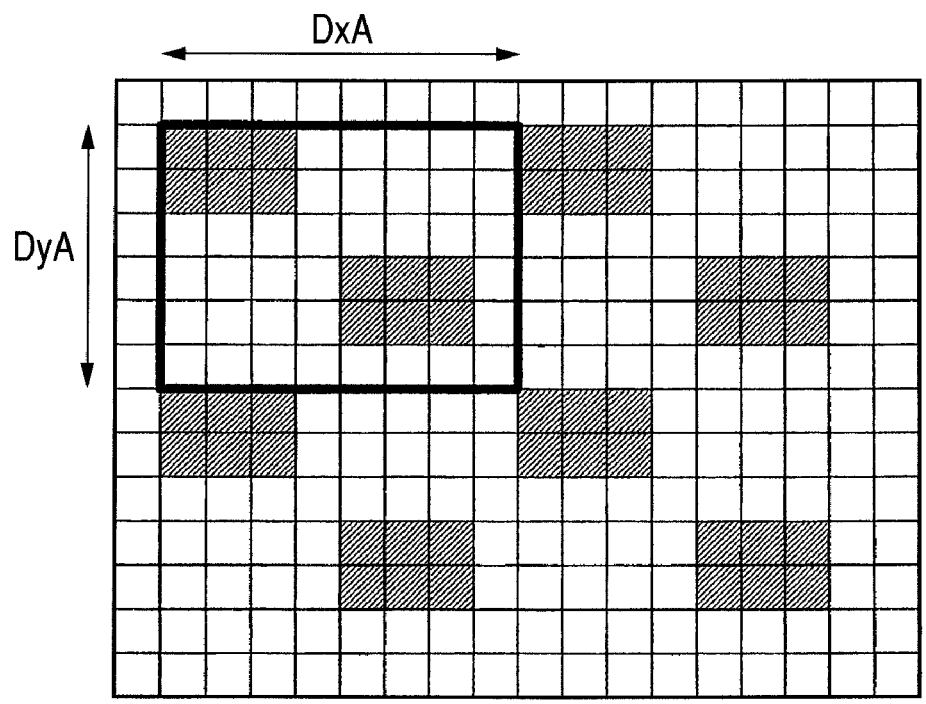
FIG. 4 illustrates a state of the halftone dots as a result of the halftone processing using the dither A according to an embodiment.
Figure 5:
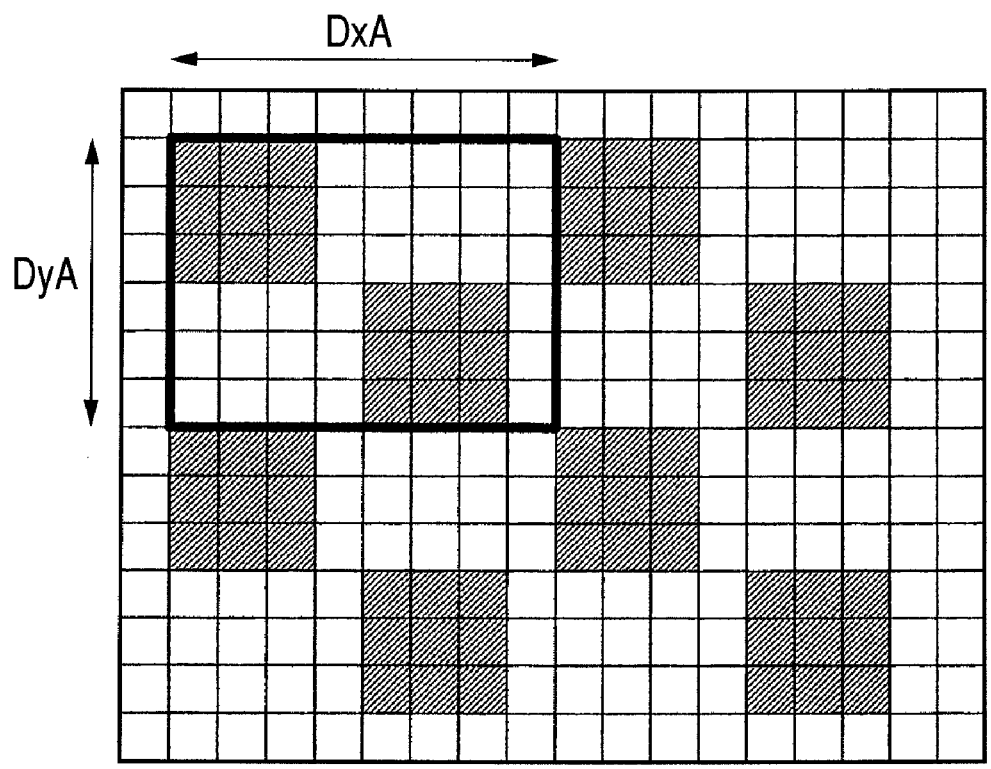
FIG. 5 illustrates a state of the halftone dots as a result of the halftone processing using the dither A according to an embodiment.

FIGS. 3, 4, and 5 illustrate states of halftone dots as a result of the execution of the halftone processing to sample input data using the dither A. FIGS. 3, 4, and 5 illustrate that the density of the halftone dots becomes higher in order of FIG. 3, FIG. 4, and FIG. 5. The sizes in a main-scanning direction and a sub-scanning direction of a minimum rectangle of the dither A are DxA and DyA, respectively. As illustrated in FIGS. 3, 4, and 5, the size/growth direction of the halftone dots to be generated differs according to the density of the original image signals. However, the pattern/period that one or more halftone dots are regularly repeated is constant throughout FIGS. 3 to 5, and this is called a halftone processing period in the present embodiment.

Figure 6:
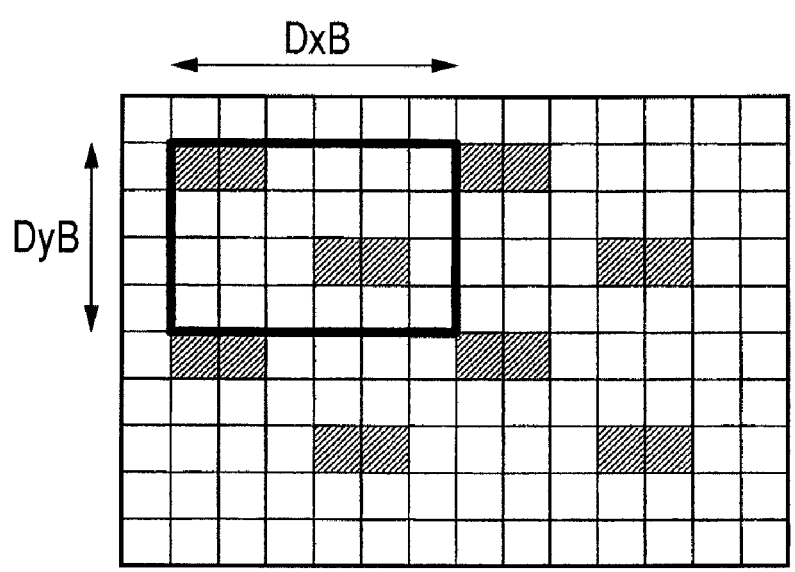
FIG. 6 illustrates a state of the halftone dots as a result of the halftone processing using a dither B according to an embodiment.
Figure 7:
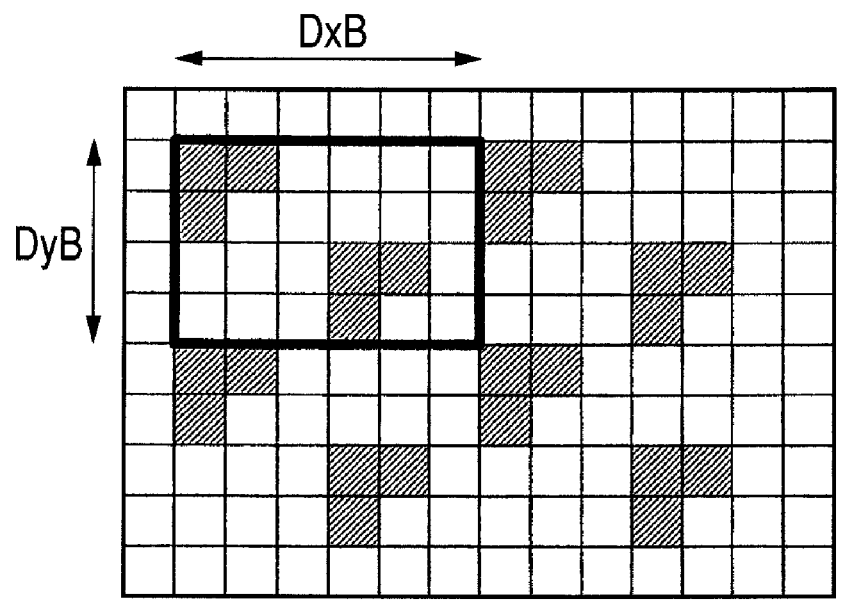
FIG. 7 illustrates a state of the halftone dots as a result of the halftone processing using the dither B according to an embodiment.
Figure 8:
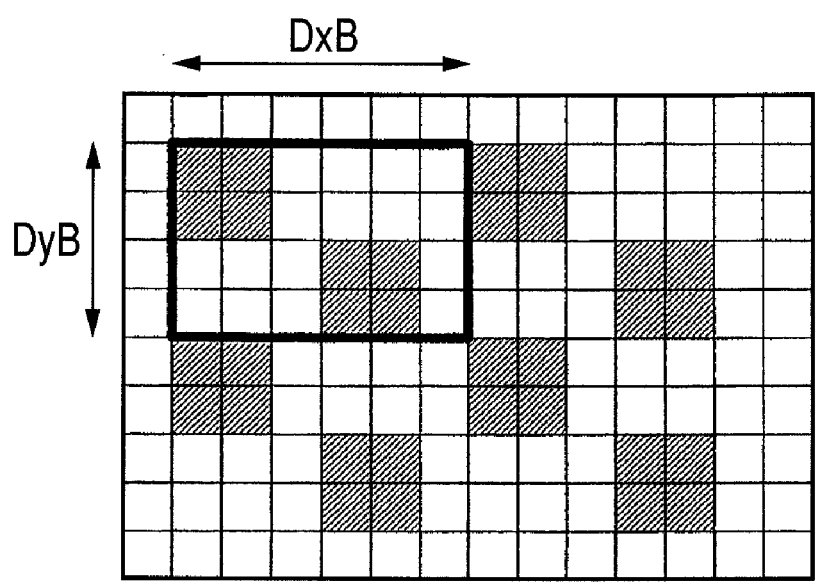
FIG. 8 illustrates a state of the halftone dots as a result of the halftone processing using the dither B according to an embodiment.

FIGS. 6, 7, and 8 illustrate states of halftone dots as a result of the execution of the halftone processing to sample input data using the dither B. FIGS. 6, 7 and 8 illustrate that the density of the halftone dots becomes higher in order of FIG. 6, FIG. 7, and FIG. 8. The sizes in the main-scanning direction and the sub-scanning direction of a minimum rectangle of the dither B are DxB and DyB, respectively.

One block of FIGS. 3 to 8 indicates one pixel of the image forming apparatus, and the halftone dots are formed at the parts illustrated with diagonal lines. The rectangles surrounded by thick lines in FIGS. 3 to 8 indicate repetitive minimum rectangles in the main-scanning direction and the sub-scanning direction of dither.

<Adding Method of Add-on Signals>

An adding method of the add-on signals indicating the tracking information according to the present embodiment will now be described. The relationship between the tracking information and the add-on signals will be defined here. Concerning the relationship between the tracking information and the add-on signals, the tracking information is formed by adding the add-on signals in a specific pattern, and for example, the tracking information indicates a unique ID of the image forming apparatus. Meanwhile, the add-on signals are equivalent to pixels (constituted by one or more pixels) for forming the tracking information.

The addition of the tracking information by the information add-on processing portion 208 is performed by applying an operation to yellow pixel data. In other words, the addition is performed by arranging a pattern of the add-on signals on the yellow pixel data, the pattern following a certain rule. Twenty five bit tracking information will be illustrated herein.

The add-on signals may be add-on to grid points illustrated by p(0,0) to p(4,4) in FIG. 9. The positions of the grid points illustrated by p(0,0) to p(4,4) will be called add-on option positions. As described in detail below, specific counter values (i,j) actually correspond to p(0,0) to p(4,4), and it should be noted that M and N of P(M,N) do not indicate counter values. The add-on option positions are arranged with intervals Tx in the X direction and Ty in the Y direction. The basic intervals Tx and Ty in the addition of the add-on signals will be called add-on periods. The add-on periods are predetermined and equivalent to the minimum intervals of add-on dots that are formed or can be formed by the add-on signals.

One-bit information is allocated to each add-on option position. The add-on signal is add-on when the bit value is 1, and the add-on signal is not add-on when the bit value is 0. The add-on option positions add-on with the add-on signals will be called add-on positions. Combinations of the bit values q(0,0) to q(4,4) of the add-on option positions p(0,0) to p(4,4) are determined according to the tracking information. Whether the bit values q(0,0) to q(4,4) correspond to ON or OFF is illustrated in Table 1. The pattern of ON and OFF of the add-on signals to the add-on option positions p(0,0) to p(4,4) constituted based on the combinations of the bit values will be called an add-on pattern. Reference numeral 303 of FIG. 9 indicates a start position (p(0,0)) of the add-on option positions.

TABLE 1

| |
| --- |
| q(0, 0) = 1 |
| q(0, 1) = 0 |
| q(0, 2) = 1 |
| q(0, 3) = 0 |
| q(0, 4) = 1 |
| q(1, 0) = 0 |
| q(1, 1) = 1 |
| q(1, 2) = 1 |
| q(1, 3) = 0 |
| q(1, 4) = 1 |
| q(2, 0) = 0 |
| q(2, 1) = 0 |
| q(2, 2) = 0 |
| q(2, 3) = 1 |
| q(2, 4) = 0 |
| q(3, 0) = 0 |
| q(3, 1) = 1 |
| q(3, 2) = 0 |
| q(3, 3) = 0 |
| q(3, 4) = 0 |
| q(4, 0) = 1 |
| q(4, 1) = 0 |
| q(4, 2) = 0 |
| q(4, 3) = 0 |
| q(4, 4) = 0 |

FIG. 10 illustrates an example of the add-on pattern based on the tracking information. In FIG. 10, grid points p(0,0) to p(4,4) indicate the add-on option positions, and among the grid points, parts of the grid points with bit value 1, or add-on with add-on signals, are illustrated with black circles. Thus, the parts illustrated with black circles, such as p(0,0), p(0,2), and p(0,4), are add-on positions. The add-on pattern illustrated in FIG. 10 is repeated for the entire image during the image formation. The bit values q(0,0) to q(4,4) at the add-on option positions p(0,0) to p(4,4) in FIG. 10 indicate 25-bit information as illustrated in Table 1.

Figure 11:
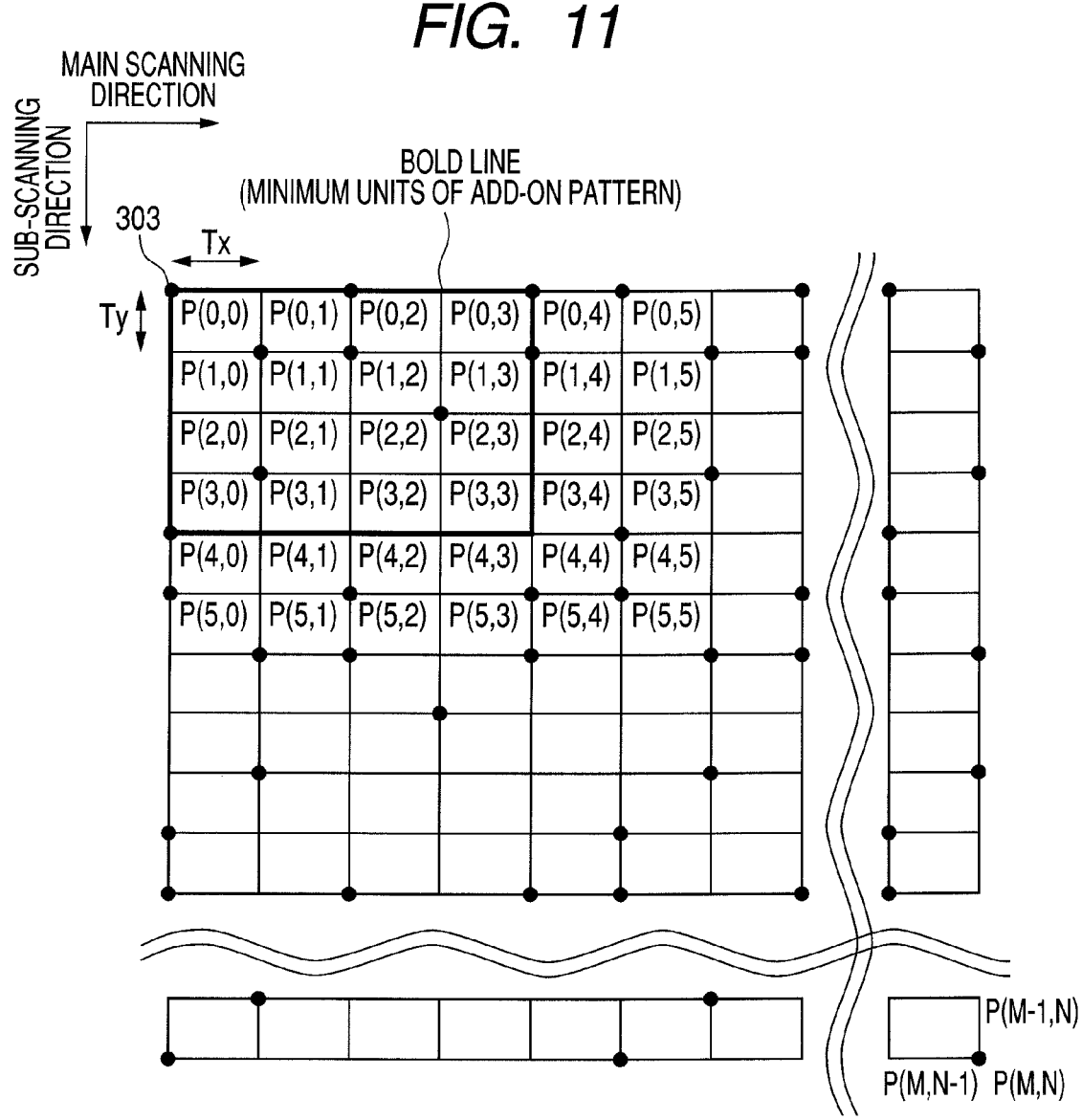
FIG. 11 illustrates that the add-on pattern is repeated for the entire image according to an embodiment.

FIG. 11 illustrates that the add-on pattern illustrated in FIG. 10 (pattern of ON and OFF of the add-on signals to the add-on option positions p(0,0) to p(4,4)) is repeated for the entire image. Grid points P(0,0) to P(M,N) of FIG. 11 indicate add-on option positions after the add-on option positions p(0,0) to p(4,4) are developed to the entire image. The addition of the add-on signals to the positions illustrated with black circles among the grid points is also shown. P(M,N) is an add-on option position of the image end. The add-on option positions add-on with the add-on signals will be referred to as add-on positions (for example, P(5,0), P(5,2), and P(5,4)) as in the case of the add-on option positions p(0,0) to p(4,4).

The part surrounded by thick lines in FIG. 11 corresponds to the add-on pattern illustrated in FIG. 10, and FIG. 11 illustrates that the add-on pattern is periodically developed in the main-scanning direction and the sub-scanning direction. Thus, the part surrounded by the thick lines is a minimum unit of the add-on pattern. Actually, several hundred add-on patterns are repeatedly formed on a surface of A4 size recording paper.

The bit values at the add-on option positions P(0,0) to P(M,N) in FIG. 11 are indicated by Q(0,0) to Q(M,N). The following formula expresses the bit value Q(i,j).

$$Q(i,j)=q(\text{MOD}(i,5),\text{MOD}(j,5))$$

MOD(a,b) indicates a residue of a/b.

<Description of Information Add-on Processing Portion 208>

An operation of the information add-on processing portion 208 will now be described.

Figure 12A:
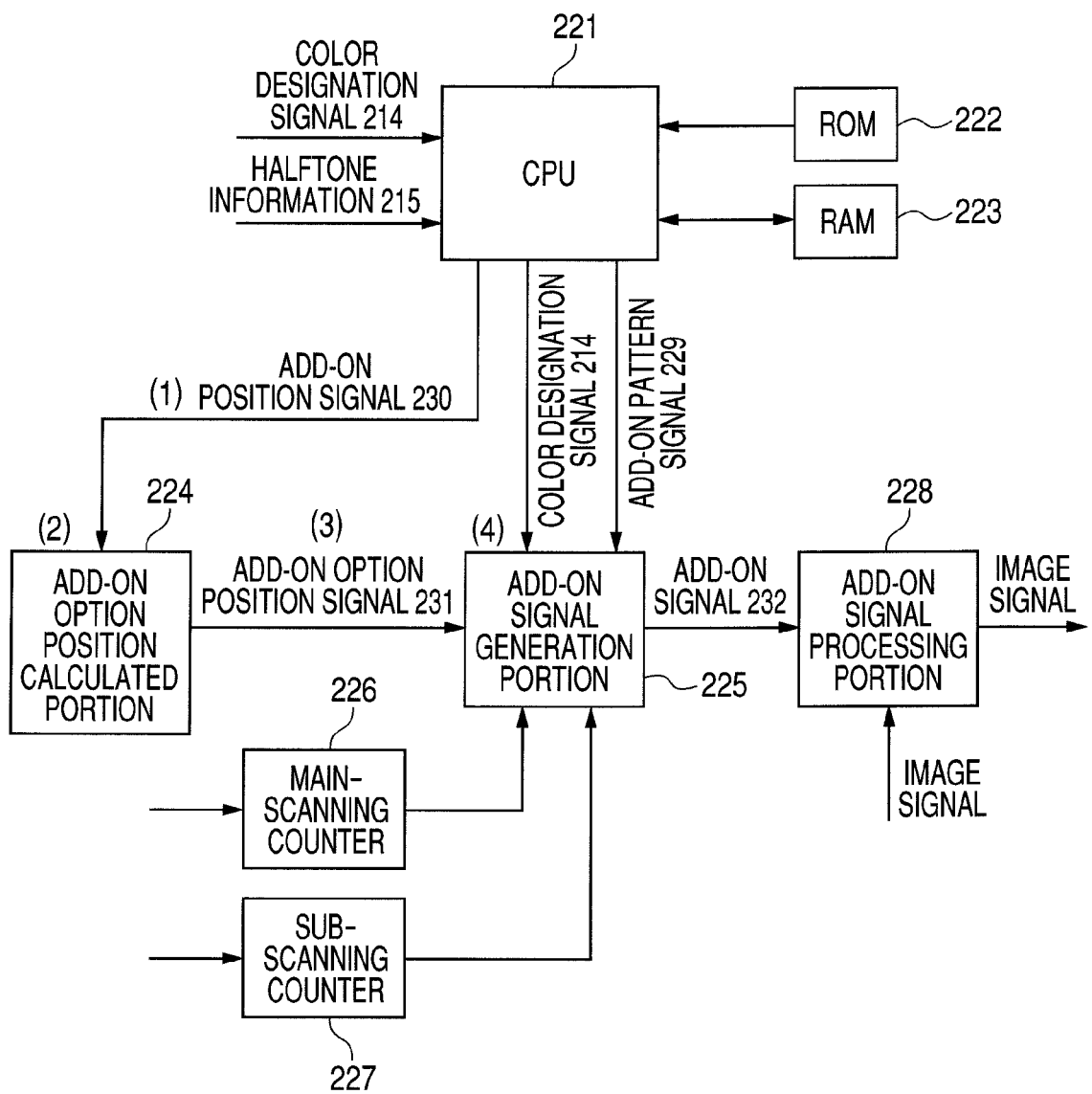
FIG. 12A is a block diagram of a configuration of an information add-on processing portion according to an embodiment.

FIG. 12A is a block diagram of the information add-on processing portion 208.

A ROM 222 stores, for example, an individual ID of the image forming apparatus as tracking information. A CPU 221 receives the individual ID from the ROM 222 during the image formation and stores the individual ID in a RAM 223. The stored individual ID data is scrambled by changing the positions of the bits according to a predetermined rule. The individual ID data is further encrypted according to a predetermined rule (encryption rule) and is then converted to ON/OFF information for allocation to the add-on option positions. The predetermined signal indicating the tracking information will be called an add-on pattern signal 229. The CPU 221 inputs the add-on pattern signal 229 to an add-on signal generation portion 225. The CPU 221 also receives the color designation signal 214 from the color conversion processing portion 205 and notifies the color designation signal 214 to the add-on signal generation portion 225.

Figure 14:
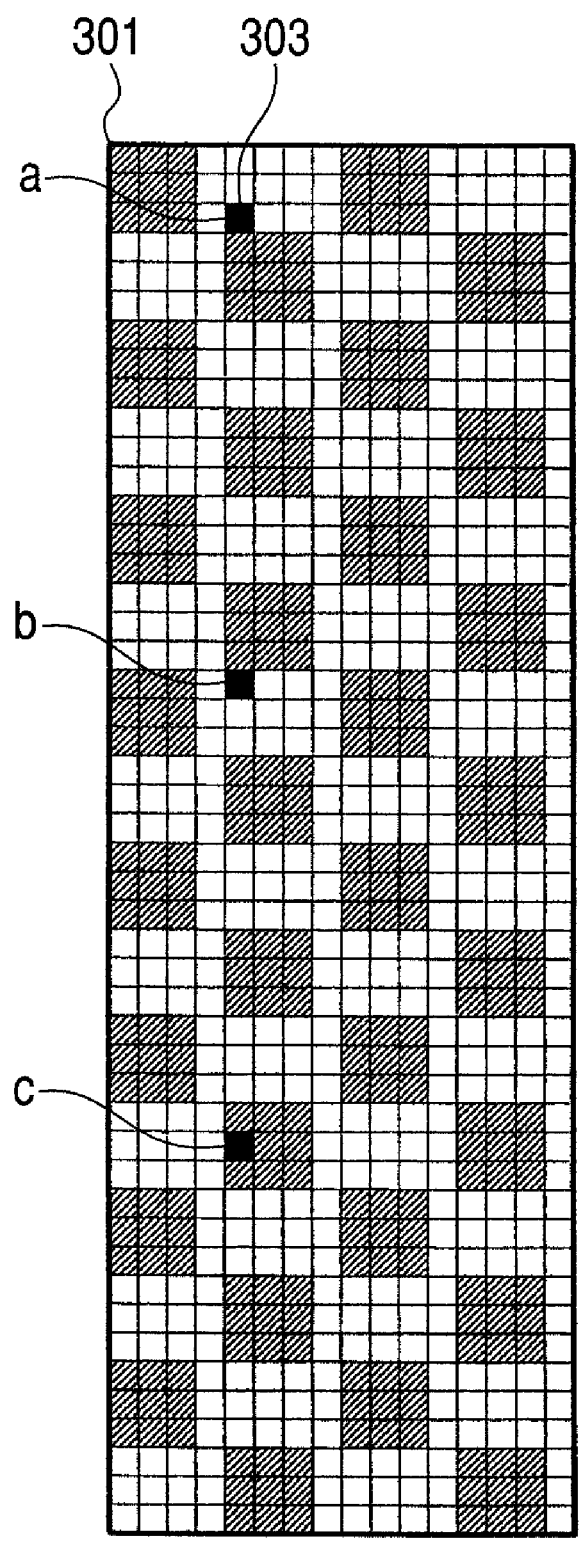
FIG. 14 illustrates a positional relationship between the add-on option positions and the halftone dots in the case of the dither A according to an embodiment.
Figure 16:
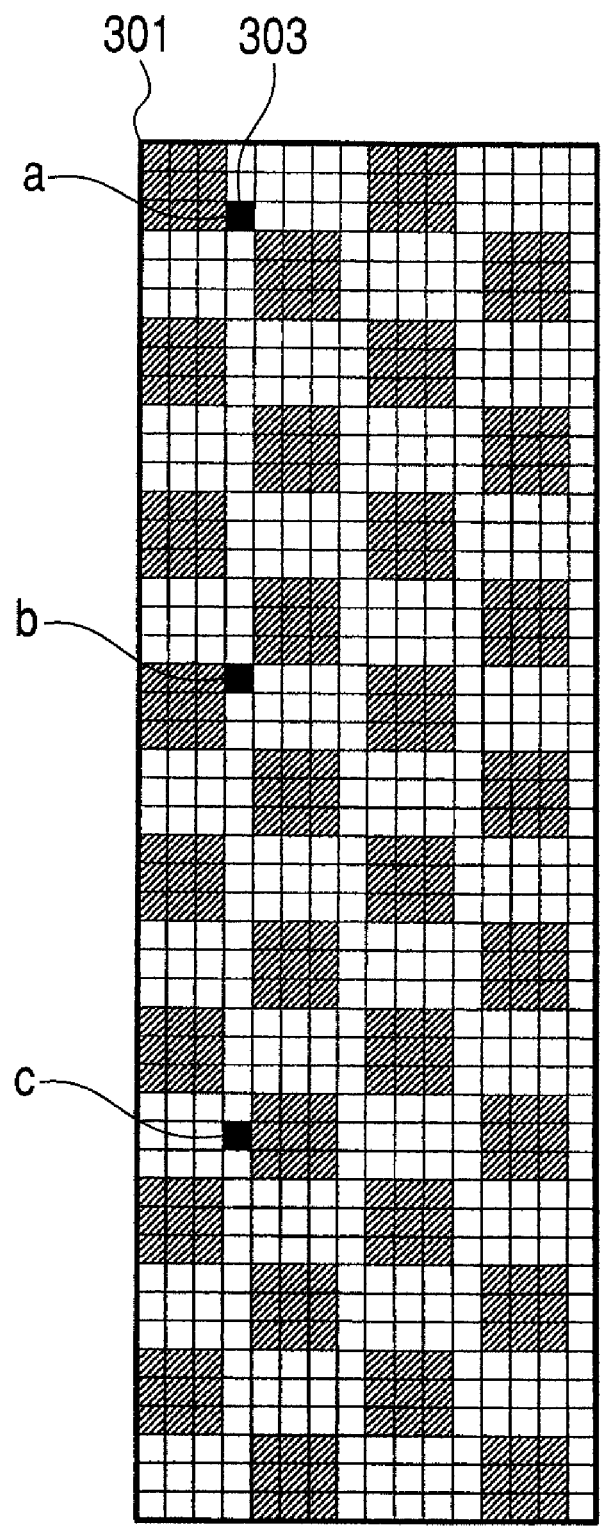
FIG. 16 illustrates a positional relationship between the add-on option positions and the halftone dots in the case of the dither A according to an embodiment.

The ROM 222 also stores add-on position parameters 230 in advance corresponding to the types of the dithers. As described in detail below, the add-on position parameters 230 can indirectly set the relative positions of the halftone dots and the add-on signals for preventing the add-on signals from overlapping the halftone dots within the image area according to the common multiple of the halftone processing period and the minimum interval of the actually formed add-on dots. Concerning the relative positions of the halftone dots and the add-on signals, the relative positions of the halftone dots and the add-on signals in FIGS. 14 and 16 are different. A desirable setting of the relative positions is that the halftone dots and all add-on dots (add-on option positions) do not overlap as much as possible as shown in FIG. 16. The CPU 221 receives the halftone information 215 from the halftone processing portion 207 and notifies the add-on position parameters 230 corresponding to the dither selected based on the dither sort information 302 to an add-on option position calculated portion 224 (position information acquisition means). The add-on option position calculated portion 224 calculates add-on option position signals 231, which indicates optimal add-on option positions for the dithers, based on the add-on position parameters 230 and notifies the add-on option position signals 231 to the add-on signal generation portion 225. An operation of the add-on option position calculated portion 224 will be described in detail below.

The ROM 222 stores add-on dot shape data not shown add-on corresponding to the parts of the black circles in FIG. 10 described below. In the present embodiment, an add-on dot has a shape made of one pixel.

A main-scanning counter 226 performs a counting operation according to a clock signal VCLK in the main-scanning direction of the image signal and notifies the count in the main-scanning direction to the add-on signal generation portion 225. A sub-scanning counter 227 performs a counting operation according to a clock signal LCLK in the sub-scanning direction and notifies the count in the sub-scanning direction to the add-on signal generation portion 225.

According to the add-on option positions indicated by the add-on option position signals 231, the ON/OFF information indicated by the add-on pattern signal 229, and the add-on dot shape data, the add-on signal generation portion 225 turns on an add-on designation signal not shown if the count reaches a value for adding the add-on signals. Add-on signals 232 generated by the add-on signal generation portions 225 are input to an add-on signal processing portion 228. This is only performed when the color designation signal 214 notified by the CPU 221 designates yellow.

When the add-on designation signal is ON, the add-on signal processing portion 228 (signal add-on means) superimposes the add-on signals 232 input from the add-on signal generation portion 225 to the input image signals and outputs the image signals superimposed with the add-on signals 232.

<Flow of Information Add-on Processing>

Figure 12B:
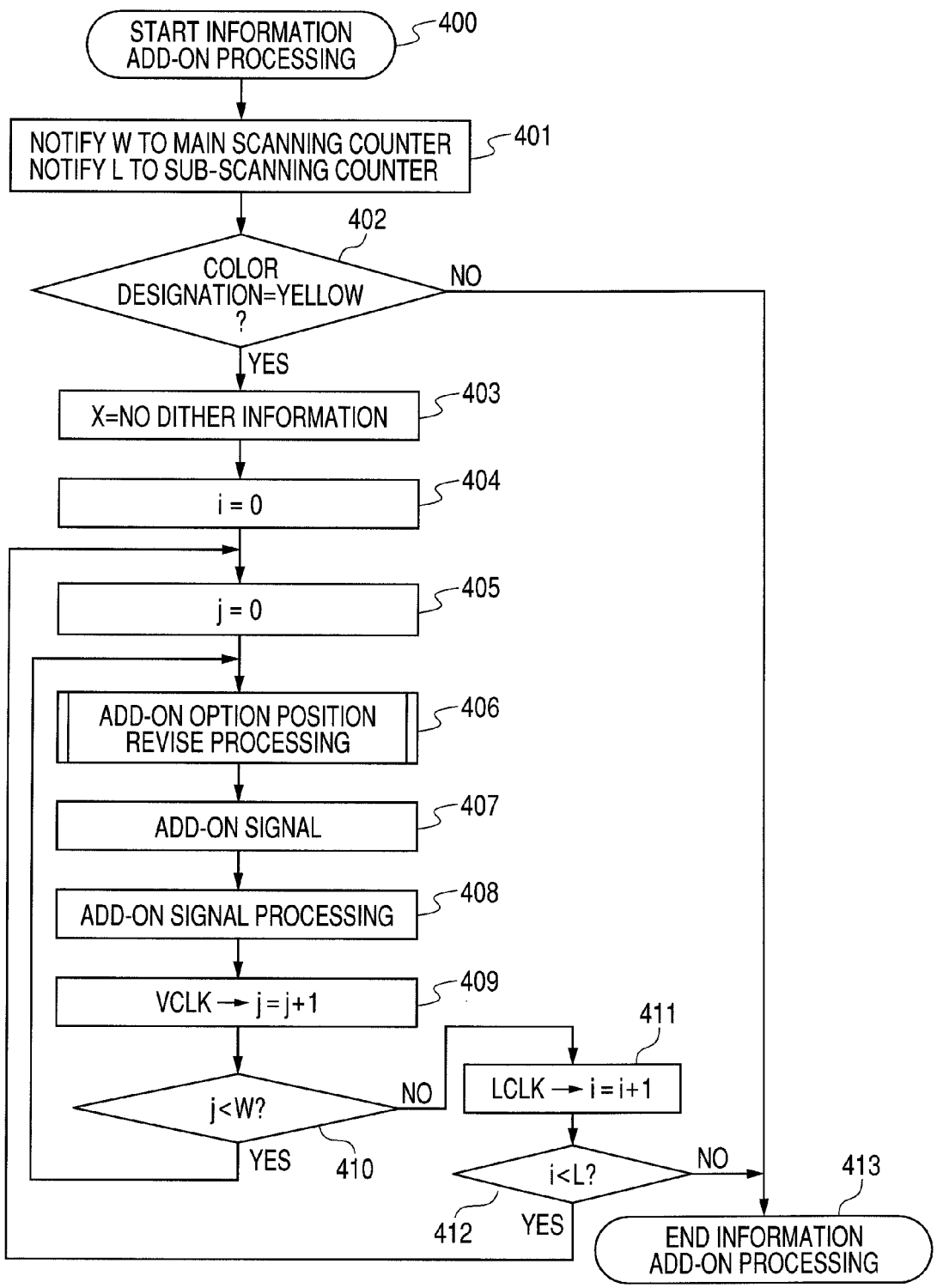
FIG. 12B is a flow chart of a flow of information add-on processing of the information add-on processing portion according to an embodiment.

FIG. 12B illustrates a flow of information add-on processing of the information add-on processing portion 208 in the image formation. A flow chart of FIG. 12B is executed according to the notification of a TOP signal from the controller 211 for the engine 212 to receive the image signal from the controller 211. In other words, the flow chart is executed for every image formation of one screen of the recording paper 11.

When the information add-on processing is started (step 400), the controller 211 notifies an image size W (whose unit is the number of pixels) in the main-scanning direction and an image size L (unit is the number of pixels) in the sub-scanning direction to the CPU 221. The CPU 221 notifies W to the main-scanning counter 226 and L to the sub-scanning counter 227 (step 401). The CPU 221 then determines whether the color designation signal 214 is yellow (step 402). The process proceeds to step 403 if step 402 is yes and proceeds to step 413 if step 402 is no to end the information add-on processing. In step 403, the CPU 221 initializes a variable X (initial value is X=no dither information) storing the dither sort information 302 and stores the value in the RAM 223. The sub-scanning counter 227 then initializes a sub-scanning counter value i to zero (step 404). The main-scanning counter 226 initializes a main-scanning counter value j to zero (step 405). The CPU 221 and the add-on option position calculated portion 224 then execute add-on option position revise processing (step 406). The details of the add-on option position revise processing (step 406) will be described below.

The add-on signal generation portion 225 then generates the add-on signals (step 407). The add-on signal processing portion 228 that adds the add-on signals to the image signals superimposes the add-on signals 232 on the image signals and outputs the image signals superimposed with the add-on signals 232 (step 408).

The main-scanning counter 226 adds 1 to the main-scanning counter value j according to the clock signal VCLK in the main-scanning direction (step 409). Then, j and W are compared (step 410). The process proceeds to step 406 if step 410 is yes and proceeds to step 411 if step 410 is no. In step 411, 1 is added to the sub-scanning counter value i according to the clock signal LCLK in the sub-scanning direction. Then, i and L are compared (step 412). The process proceeds to step 405 if step 412 is yes and proceeds to step 413 if step 412 is no to end the information add-on processing.

Flow of Add-on Option Position Revise Processing

Figure 12C:
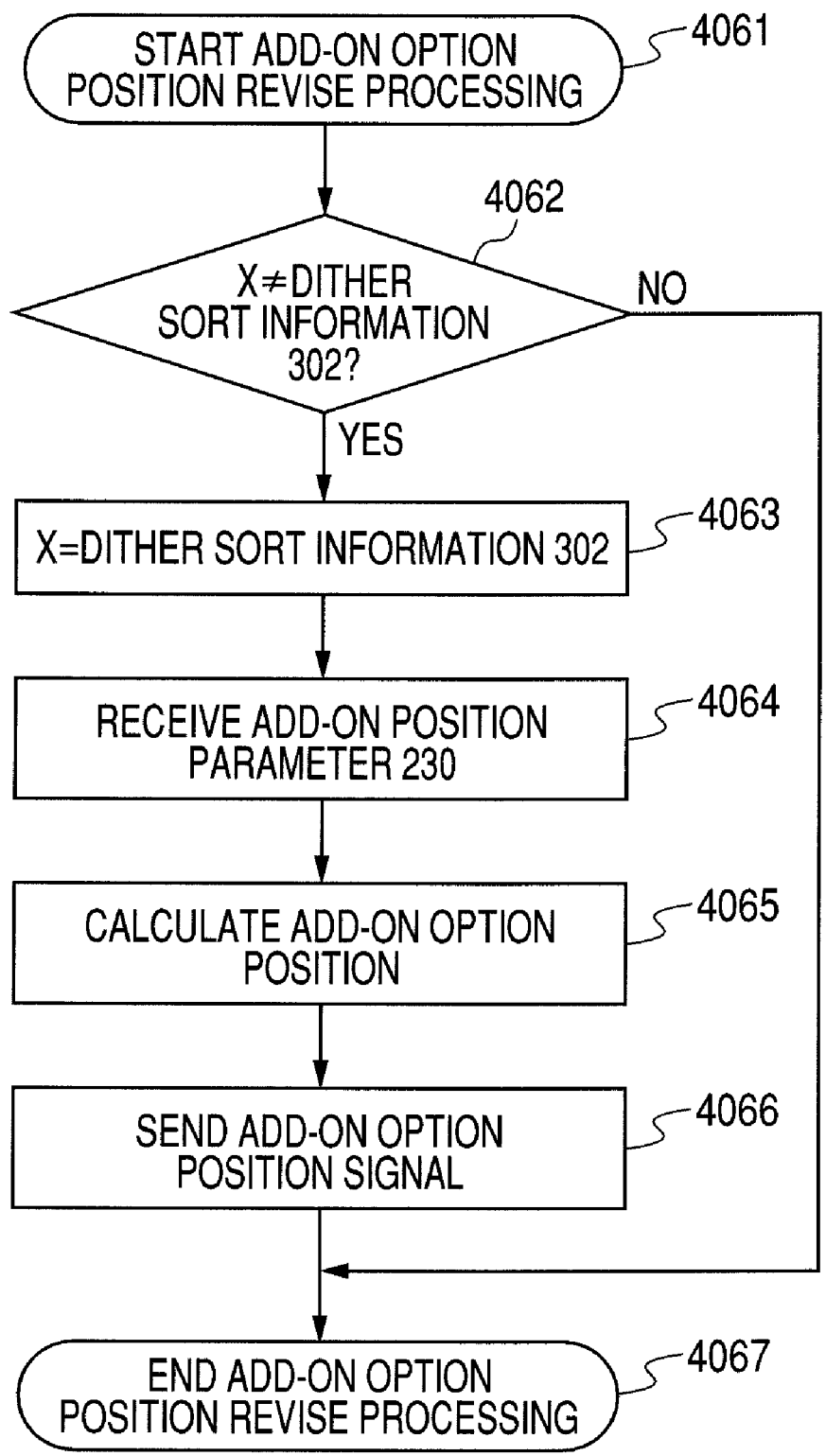
FIG. 12C is a flow chart of a flow of add-on option position revise processing according to an embodiment.

FIG. 12C illustrates a flow of the add-on option position revise processing (step 406).

When the add-on option position revise processing is started (step 4061), the CPU 221 compares the dither sort information 302 in the halftone information 215 with the variable X (step 4062). The variable X is "X=no dither information" (FIG. 12B, step 403) when the add-on option position revise processing (step 406) is executed for the first time after the start of the image formation and is "X=dither A" or "X=dither B" in other cases. The process proceeds to step 4063 if step 4062 is yes and proceeds to step 4067 if step 4062 is no to end the add-on option position revise processing. In step 4063, the CPU 221 overwrites the value of the variable X to the value of the dither sort information 302. The add-on option position calculated portion 224 then receives (acquires) the add-on position parameters 230 sent from the CPU 221 (step 4064). The add-on option position calculated portion 224 calculates the add-on option positions (step 4065). The add-on option position calculated portion 224 then sends the add-on option position signals 231 to the add-on signal generation portion 225 (step 4066), and the add-on option position revise processing ends (step 4067).

In the present embodiment, the add-on option position revise processing (step 406) is executed fast relative to the transmission speed of the image signals.

<Description of Operation of Add-on Option Position Calculated Portion 224>

When Dither A Is Designated

An operation of the add-on option position calculated portion 224 will be described. The case in which the dither sort information 302 of the halftone information 215 has designated the dither A will be described first.

The positional relationship between the halftone dots and the add-on option positions of the dither A will be described. In the example herein, the following conditions (a) to (f) are met in the arrangement. The main-scanning direction will be referred to as X direction, and the sub-scanning direction will be referred to as Y direction.

(a) An allowable positional error of the add-on option positions is ±1. If the positions of the add-on option positions are significantly changed to prevent the add-on option position from overlapping the halftone dots of the dither, the analysis apparatus that analyzes the tracking information cannot accurately discriminate the add-on signals. As a result, the analysis apparatus cannot accurately identify the add-on pattern. In other words, the analysis apparatus that analyzes the tracking information can recognize the tracking information if the error is in a certain range from the add-on option positions. Examples of the analysis apparatus that analyzes the tracking information include a copy machine and a computer connected to a scanner.

(b) The add-on pattern has a 5×5 period as shown in FIG. 10.

(c) Tx=16 and Ty=16 (add-on periods).

(d) The add-on dots on the printed material can be recognized if the halftone dots and the add-on dots (dots generated by the add-on signals) do not overlap or if the halftone dots and the add-on dots overlap within the allowable range for the analysis apparatus to analyze the tracking information.

(e) The density change due to a difference in the ways the halftone dots and the add-on dots are connected is allowable.

(f) The add-on dots would only have to be recognized when the sheet is blank or with the densities as shown in FIGS. 3 to 5. In other words, the arrangement is based on an image with intermediate density, not a solid image.

The halftone processing period and the add-on period of the add-on option position of the dither A are integral multiples in the X direction (DxA=8 and Tx=16), but are not integral multiples in the Y direction (DyA=6 and Ty=16). Therefore, the positional relationship between the add-on option positions and the halftone dots changes. The positional relationship between the add-on option positions and the halftone dots periodically changes at periods of least common multiples of Tx and DxA as well as Ty and DyA at the maximum. Thus, in this case, the minimum units are 16 pixels (least common multiple of Tx and DxA) in the X direction and 48 pixels (least common multiple of Ty and DyA) in the Y direction. Therefore, the positional relationship between the halftone dots and the add-on option positions needs only be considered within the range.

Figure 13:
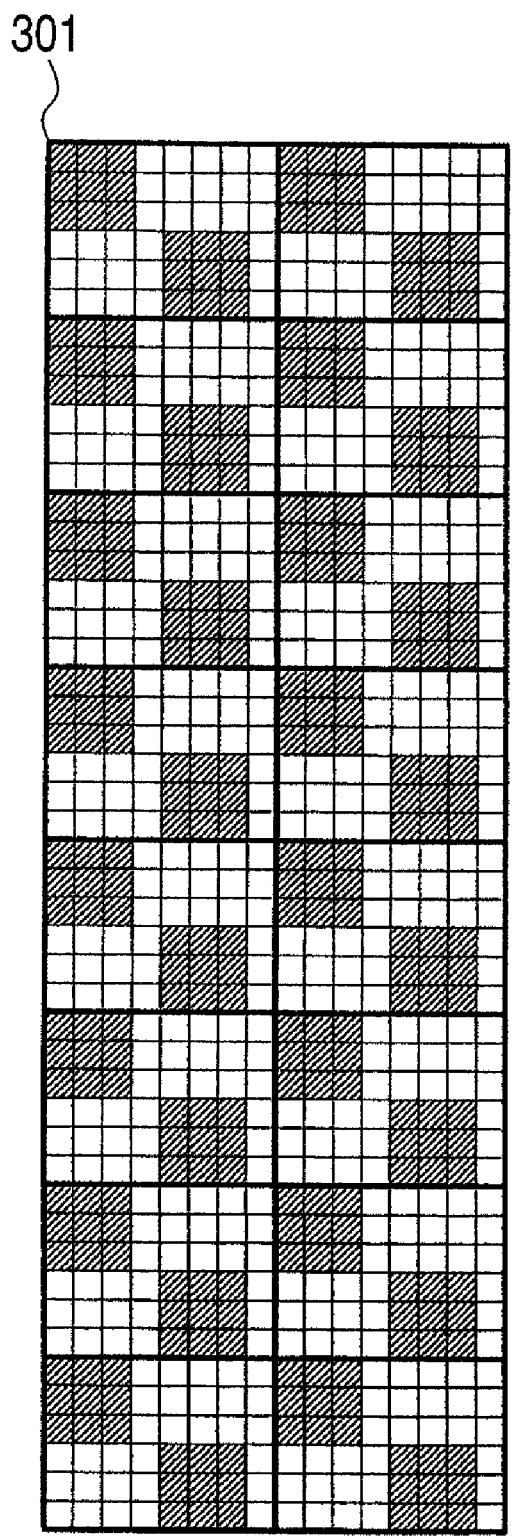
FIG. 13 illustrates the halftone processing in the case of the dither A according to an embodiment.

FIG. 13 illustrates halftone dots of the dither A with the density shown in FIG. 5 in an image having the size of 16 pixels in the X direction and 48 pixels in the Y direction. Reference numeral 301 denotes the halftone processing reference position.

FIG. 14 illustrates an example of a change in the positional relationship between the halftone dots and the add-on option positions of the dither illustrated in FIG. 13. Reference numeral 301 of FIG. 14 illustrates the halftone processing reference position. One block of FIGS. 13 and 14 denotes one pixel of the image forming apparatus, and the halftone dots are formed in the areas illustrated with diagonal lines. FIG. 14 illustrates that the add-on option positions are arranged based on the position a with respect to the halftone processing reference position 301, and the shaded parts a, b, and c illustrate the add-on option positions. Reference numeral 303 illustrates the start position P(0,0) (or p(0,0)) of the add-on option positions. Reference character a corresponds to the add-on option position P(0,0) (or p(0,0)), b corresponds to the add-on option position P(1,0) (or p(1,0)), and c corresponds to the add-on option position P(2,0) (or p(2,0)). The pixels, the halftone dots, and the add-on option positions will also be illustrated in the same way in the following drawings. As shown in FIG. 14, the positional relationship between the halftone dots and the add-on option positions a, b, and c changes. Particularly, the halftone dots and the add-on option positions overlap in the case of the add-on option position c. Therefore, even if the add-on dot is added at the add-on option position c, the add-on dot cannot be recognized, or the add-on dot would be unlikely to be recognized.

Figure 15:
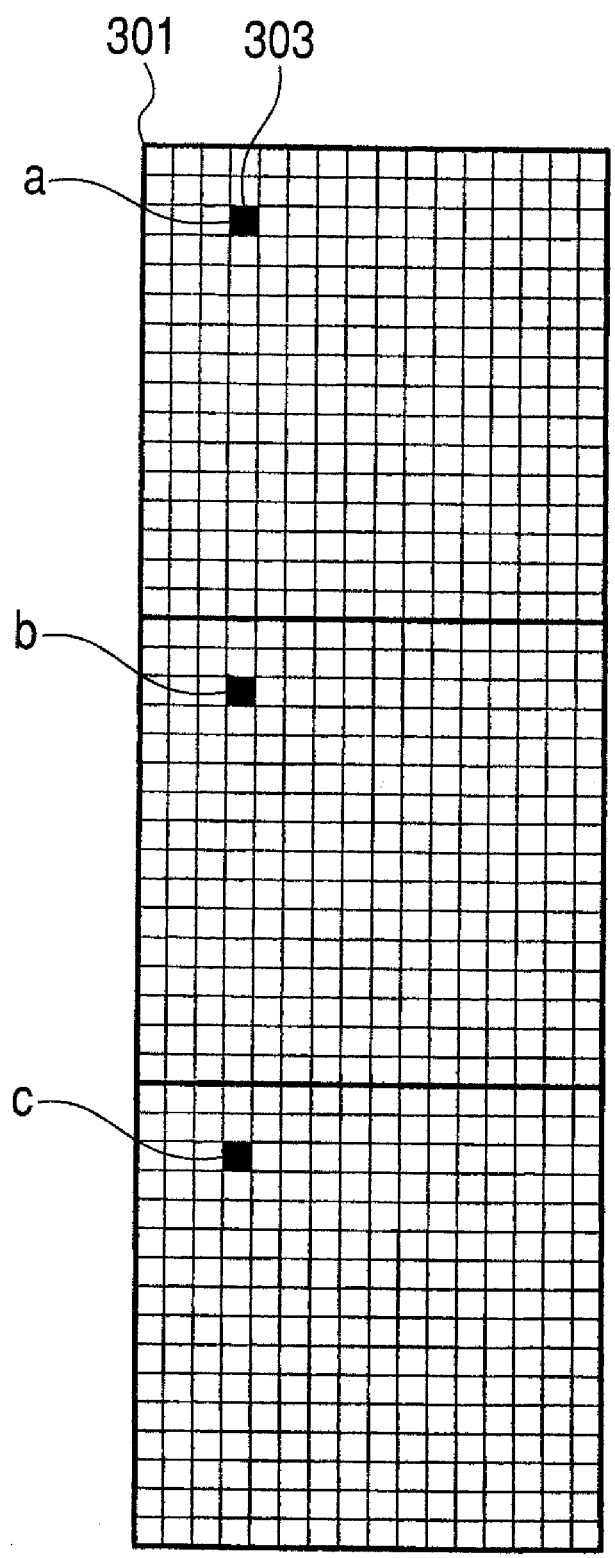
FIG. 15 illustrates positions of the add-on option positions according to an embodiment.

Thus, the arrangement of the add-on option positions at the positions as shown in FIG. 15 can be considered. In FIG. 15, the relationship between the halftone dots and the add-on option positions are made appropriate to prevent the add-on signals from overlapping the halftone dots in the image area according to the common multiple of the halftone processing period and the minimum interval of the add-on dots. The arrangement of the add-on option positions as shown in FIG. 15 can establish an excellent relationship between the add-on dots actually added and the halftone dots.

Reference numeral 303 of FIG. 15 illustrates the start position P(0,0) (or p(0,0)) of the add-on option positions. In FIG. 15, the add-on option position is arranged at the position +3 in the X direction and +2 in the Y direction from the halftone processing reference position 301. FIG. 16 illustrates the positional relationship between the halftone dots and the add-on option positions. In relation to the add-on option start position, the position in the main-scanning direction from the upper left of FIG. 16, i.e. halftone processing reference position 301, will be referred to as Sx, and the position in the sub-scanning direction will be referred to as Sy.

As can be seen from FIG. 16, although the positional relationship between the halftone dots and the add-on option positions changes, the add-on option positions are arranged so that the halftone dots and the add-on option positions do not overlap. Thus, in the case of the dither A, the positional relationship between the halftone dots and the add-on option positions can be improved (when the conditions (a) to (f) are met) by making the start position 303 (P(0,0) (or p(0,0))) of the add-on option positions appropriate. Adding another point, as described in (f), the relative position between the halftone dots and the add-on option positions is based on up to a certain density to prevent the add-on signals from overlapping the halftone dots. As described in FIGS. 6 to 8, even if the density is high in some degree, the relative positional relationship between the halftone dots and the add-on option positions is set in consideration of the growth direction of the image in the dither. Therefore, the case in which the density is high in some degree can be treated.

Figure 17:
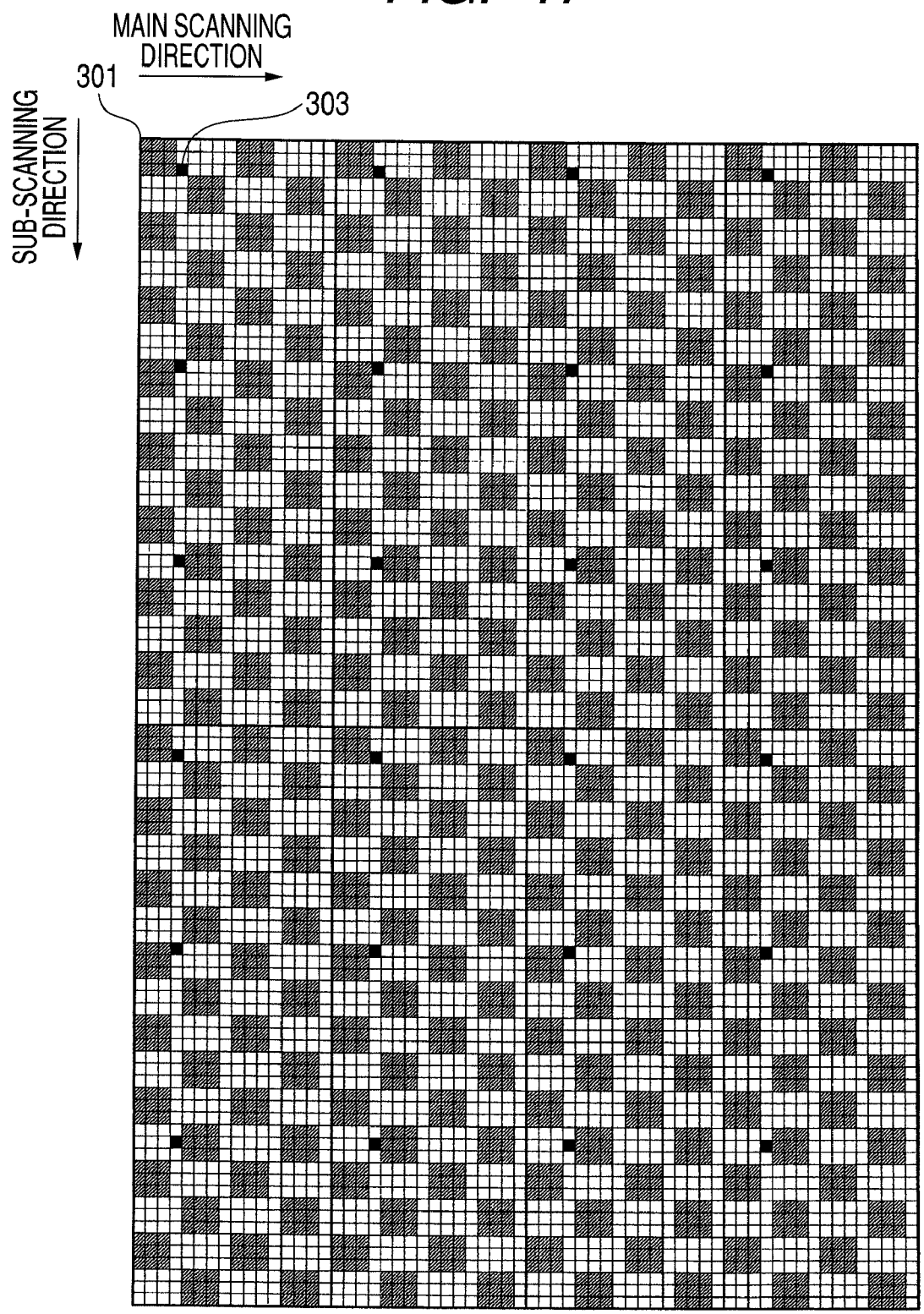
FIG. 17 illustrates a positional relationship between the add-on option positions and the halftone dots in the case of the dither A according to an embodiment.

FIG. 17 illustrates that the image area (FIG. 16) according to the least common multiple of the halftone processing period and the minimum interval of the add-on dots formed by the add-on signals is widely developed. The unit of the image areas of FIG. 16 in FIG. 17 may also be called a first image area, a second image area, . . . and an Nth image area. As shown in FIG. 17, the positional relationship between the halftone dots and the add-on option positions periodically changes with the period of 16 pixels in the X direction and 48 pixels in the Y direction. All add-on option positions are arranged so as not to overlap with the halftone dots (halftone dots corresponding up to a certain density). Thus, the arrangement allows to recognize the halftone dots and the add-on dots regardless of the add-on pattern.

In this case, it is guaranteed that the halftone dots and the add-on dots do not overlap or overlap within the allowable range in the image area according to the least common multiple value of FIG. 16. Therefore, the add-on control processing of the add-on signals started from the start position 303 of the add-on option positions can be continued for b and c within the range of 16 pixels×48 pixels illustrated in FIG. 16. The add-on control processing is continued through a, b, and c within 48 pixels in the Y direction. In other words, the add-on control processing is repeated through a, b, and c in the next image area according to the least common multiple with the minimum interval (add-on period Ty in the dither A) of the add-on dots in the case of the dither A.

In this way, the relationship between the halftone dots and the add-on option positions is made appropriate. Therefore, a process similar to the add-on control processing for determining the add-on option position b of FIG. 16 can be repeated and continued for the next image area equivalent to the area in FIG. 16 that continues in the X direction (the next image area will be called a second image area as opposed to the first image area of FIG. 16) within the range of the second image area. Add-on control processing similar to the add-on control processing for determining the add-on option positions a, b, and c of the first image area can be repeated with the period of 48 pixels not only in the X direction, but also in the Y direction. The add-on control processing of the add-on signals 232 herein is a generic term of part or all of the processing by the add-on option position calculated portion 224 (add-on control means) and the add-on signal generation portion 225 (add-on control means) described in FIG. 12A. More specifically, the add-on control processing is equivalent to part or all of the processing of the flow chart described in FIG. 12C.

Figure 18:
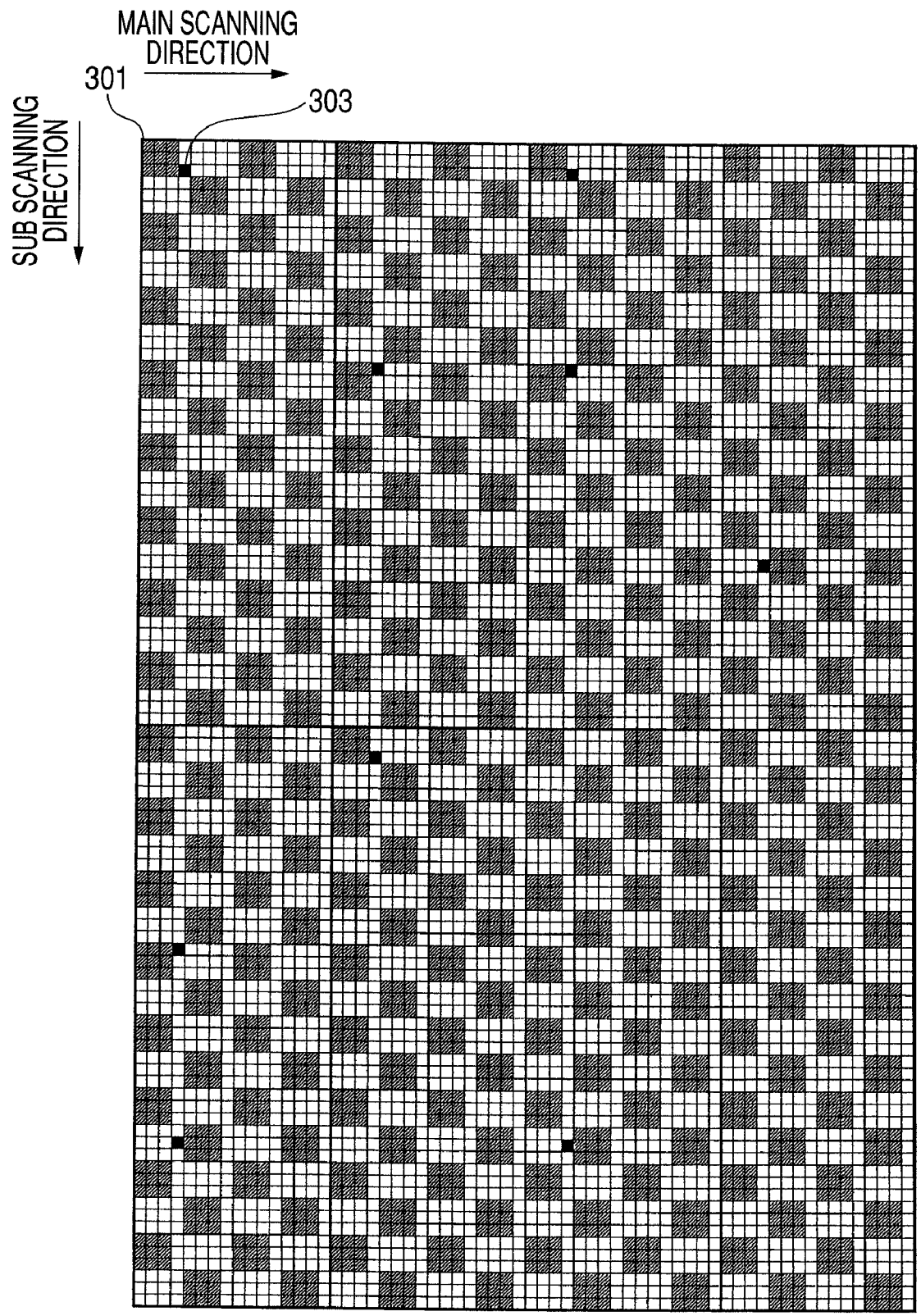
FIG. 18 illustrates a positional relationship between the add-on signals and the halftone dots in the case of the dither A according to an embodiment.

As an example, FIG. 18 illustrates add-on positions in which the add-on dots are add-on to the add-on option positions illustrated in FIG. 17 with the add-on pattern illustrated in FIG. 10 by executing the add-on control processing described above. In FIG. 18, the blackened blocks indicate the add-on dots (dots generated by the add-on signals) and are arranged at the positions that do not overlap with the halftone dots. The positional relationship between the halftone dots and the add-on option positions or the add-on positions with the density illustrated in FIG. 5 has been described. Even if the density is lower than in FIG. 5 (for example, FIGS. 3 and 4), the positions of the halftone dots and the add-on option positions or the add-on positions do not overlap.

An operation of the add-on option position calculated portion 224 for realizing the above arrangement will now be described. In the following description, the coordinate of the halftone processing reference position 301 is (Hy,Hx)=(0,0). However, (Hy,Hx)=(0,0) is an example, and the coordinates are not limited to this. According to the present embodiment, the controller notifies the values of Hy and Hx, or the halftone processing reference position 301, even if the type of the dither changes in the middle of the page. Therefore, the add-on dots can be add-on to appropriate positions based on the coordinates (Hy,Hx). In this case, the halftone processing reference position 301 can be considered as position information for determining the relative position between the halftone dots and the add-on signals for preventing the add-on signals from overlapping the halftone dots within the image area according to the common multiple of the halftone processing period and the minimum interval of the add-on dots. If both Hy and Hx are not zero, Hy and Hx are important in determining the relative position of the halftone dots and the add-on dots. This is indicated in a formula of P(i,j) described below.

In the following description, the halftone processing reference position 301 and the start position 303 of the add-on option positions will be described separately. However, the controller 211 may notify the information, in which the start position 303 of the add-on option positions is added to the halftone processing reference position 301, and the engine 212 may acquire the information.

The add-on position parameters 230 as position information for determining the relative position of the add-on signals and the halftone dots are the following Sx, Sy, Tx, and Ty when the dither sort information 302 of the halftone information 215 is the dither A, and the four add-on position parameters 230 are recorded in the ROM 222. The add-on pattern signal 229 is illustrated with q in Table 1. Sx, Sy, Tx, and Ty as the add-on position parameters 230 are assumed as follows, and the processing will be described in order of (1) to (4) illustrated in FIG. 12A.

[Dither A]

Halftone processing reference position 301 Hx(=0), Hy(=0)

Start position 303 of add-on option positions Sx(=3), Sy(=2)

Add-on period Tx(=16), Ty(=16)

(1) The CPU 221 reads the add-on position parameters 230 (Sx, Sy, Tx, Ty) from the ROM 222 and notifies the add-on position parameters 230 to the add-on option position calculated portion 224.

(2) The add-on option position calculated portion 224 calculates the add-on option positions P(0,0) to P(M,N) with the following formula based on the add-on position parameters 230.

$$P(i,j)=(i \times Ty+Sy+Hy, j \times Tx+Sx+Hx)$$

In the values of the add-on option position P(i,j), the first element (I×Ty+Sy+Hy) corresponds to the counter value in the sub-scanning direction, and the second element (j×Tx+Sx+Hx) corresponds to the counter value in the main-scanning direction.

The following shows specific calculations.

$$P(0,0)=(0 \times 16+2+0, 0 \times 16+3+0)=(2,3)$$

$$P(0,1)=(0 \times 16+2+0, 1 \times 16+3+0)=(2,19)$$

$$P(0,2)=(0 \times 16+2+0, 2 \times 16+3+0)=(2,35)$$

...

$$P(1,0)=(1 \times 16+2+0, 0 \times 16+3+0)=(18,3)$$

$$P(1,1)=(1 \times 16+2+0, 1 \times 6+3+0)=(18,19)$$

...

$$P(M,N)=(M \times 16+2+0(y \text{ coordinate}), N \times 16+3+0(x \text{ coordinate}))$$

(3) The add-on option position calculated portion 224 notifies the add-on option positions calculated in (2) to the add-on signal generation portion 225 as the add-on option position signals 231.

(4) The add-on signal generation portion 225 sets the add-on signals to 1 if the counter values of the main-scanning counter 226 and the sub-scanning counter 227 are determined to correspond to the add-on option position signals 231, and the corresponding add-on pattern signal 229 is 1. In other cases, the add-on signal generation portion 225 sets the add-on signals to 0. The add-on pattern signal 229 corresponding to the add-on option positions P(i,j) refers to the values of Q(i,j), or q(MOD(i,5),MOD(j,5)) as described above. The default value of the add-on signals 232 is 0.

The main-scanning counter 226 or the sub-scanning counter 227 operates, and the position reaches the add-on option position P(0,0) when the counter value of the main-scanning counter 226=2 and the counter value of the sub-scanning counter 227=3. The bit value Q(0,0) corresponding to the add-on option position P(0,0) is checked. The add-on signal 232 is set to 1, because the corresponding bit value is Q(0,0)=1(ON state). Thus, the add-on option position P(0,0) is an add-on position. If the counter value changes, the add-on signal 232 is restored to 0.

The main-scanning counter 226 and the sub-scanning counter 227 further operate, and the position reaches the add-on option position P(0,1) when the counter value of the main-scanning counter 226=2 and the counter value of the sub-scanning counter 227=19. The bit value Q(0,1) corresponding to the add-on option position P(0,1) is checked. The add-on signal 232 remains 0, because the corresponding bit value is Q(0,1)=0(OFF state). Thus, the add-on option position P(0,1) is not an add-on position.

Subsequently, similar operations are repeated until the position reaches the add-on option position P(M,N) at the image end. The add-on signals 232 for the dither A are generated with the forgoing procedure. The add-on signal processing portion 228 adds the add-on signals 232 generated by the add-on signal generation portion 225 to the image signals.

In this way, the initial position is determined so that the halftone dots and the add-on signals do not overlap as a result of the halftone processing in the image area according to the least common multiple of the halftone processing period and the minimum interval of the add-on dots, and similar add-on control processing is repeated based on the initial position. Therefore, the load of the image forming apparatus can be reduced. More specifically, similar processing can be repeated in the next image area according to the least common multiple adjacent in the X and Y directions. Therefore, the load of analyzing the relationship between irregular halftone dots and add-on dots in each occasion as in conventional techniques can be reduced.

When Dither B is Designated

The case in which the dither sort information 302 of the halftone information 215 has designated the dither B will now be described.

The positional relationship between the halftone dots and the add-on option positions of the dither B will be described first. In this case, the conditions (a) to (e) are met in the arrangement as in the case of the dither A. The following is further established as a condition (f).

(f) The add-on dots (dots generated by the add-on signals) need only be recognized when the sheet is blank or with the densities shown in FIGS. 6 to 8.

Figure 19:
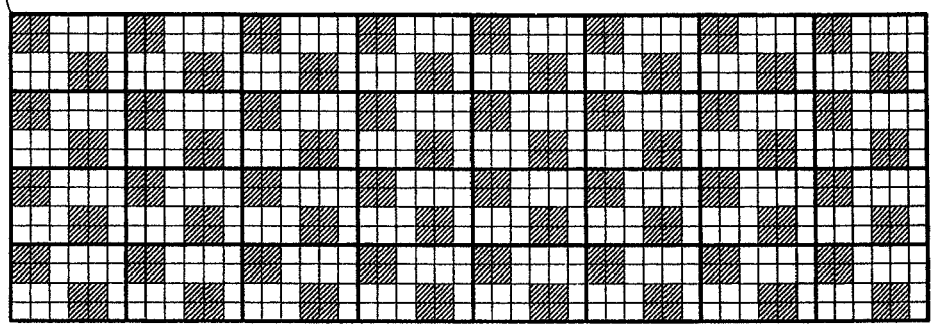
FIG. 19 illustrates the halftone processing in the case of the dither B according to an embodiment.

The halftone processing period and the add-on period of the add-on option positions of the dither B are integral multiples in the Y direction (DyB=4 and Ty=16), but are not integral multiples in the X direction (DxB=6 and Tx=16). Therefore, the positional relationship between the add-on option positions and the halftone dots changes. The positional relationship between the add-on option positions and the halftone dots periodically changes at periods of least common multiples of Tx and DxB as well as Ty and DyB at the maximum as in the case of the dither A. In this case, the minimum units are 48 pixels (least common multiple of Tx and DxB) in the X direction and 16 pixels (least common multiple of Ty and DyB) in the Y direction. Therefore, the positional relationship between the halftone dots and the add-on option positions needs only be considered within the range. FIG. 19 illustrates halftone dots of the dither B with the density shown in FIG. 8 in an image having the size of 48 pixels in the X direction and 16 pixels in the Y direction. Reference numeral 301 denotes the halftone processing reference position.

Figure 20:
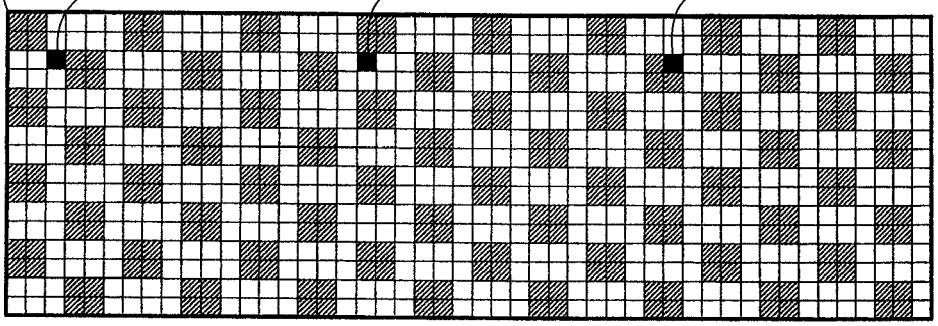
FIG. 20 illustrates a positional relationship between the add-on option positions and the halftone dots in the case of the dither B according to an embodiment.

FIG. 20 illustrates an example of a change in the positional relationship between the halftone dots and the add-on option positions of the dither illustrated in FIG. 19. FIG. 20 illustrates that the add-on option positions are arranged based on the position a with respect to the halftone processing reference position 301, and the shaded parts a, b, and c illustrate the add-on option positions. Reference character a corresponds to the add-on option position P(0,0) (or p(0,0)), b corresponds to the add-on option position P(0,1) (or p(0,1)), and c corresponds to the add-on option position P(0,2) (or p(0,2)). Reference numeral 303 illustrates the start position of the add-on option positions.

Figure 21:
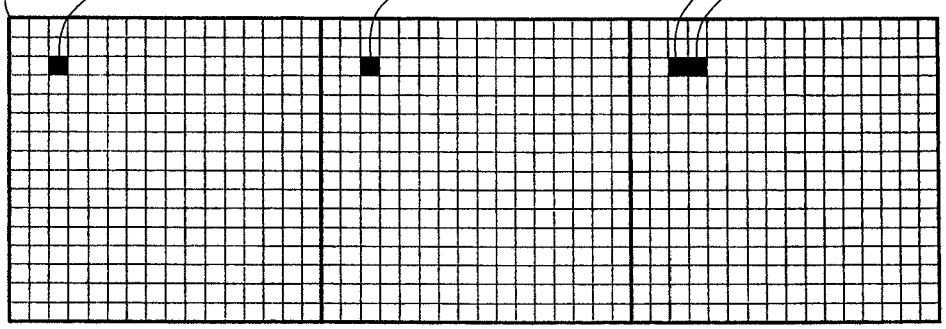
FIG. 21 illustrates positions of the add-on option positions according to an embodiment.

As shown in FIG. 20, the positional relationship between the halftone dots and the add-on option positions a, b, and c changes. Particularly, the halftone dots and the add-on option positions overlap in the case of the add-on option position c. Therefore, even if the add-on dot is add-on to the add-on option position c, the add-on dot cannot be recognized. Furthermore, unlike in the case of the dither A, one of the three add-on option positions overlaps the halftone dot in the case of the dither B no matter where the start position 303 (P(0,0)) of the add-on option positions is moved. Thus, the arrangement of the add-on option positions at the positions shown with a, b, and d in FIG. 21 can be considered. More specifically, the add-on option position is moved for only one pixel from c to d as illustrated in FIG. 21. Based on the condition (a), the movement is within the allowable positional error of the add-on option positions. In this way, the add-on option position calculated portion 224 sets the add-on option position to the position d moved from a specific position c, if the add-on option position is at a specific position, such as the add-on option position c, that overlaps the halftone dot. In other words, the add-on option position calculated portion 224 determines whether the add-on option position is at a specific position such as the add-on option position c.

Figure 22:
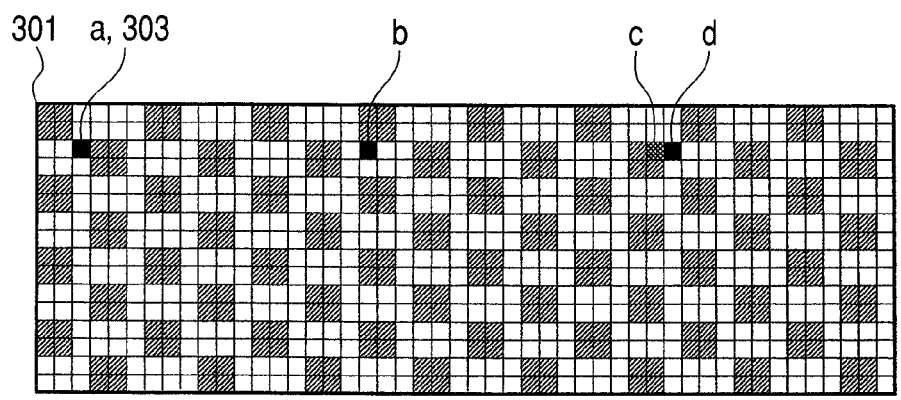
FIG. 22 illustrates a positional relationship between the add-on option positions and the halftone dots in the case of the dither B according to an embodiment.

FIG. 22 illustrates the positional relationship between the halftone dots and the add-on option positions in this case. The following can be understood from FIG. 22. More specifically, although the positional relationship between the halftone dots and the add-on option positions changes after the add-on option position is moved within an allowable value α (from the shaded part c to blackened d in FIG. 22), an arrangement is made so that the halftone dots and the add-on option positions do not overlap.

Figure 23:
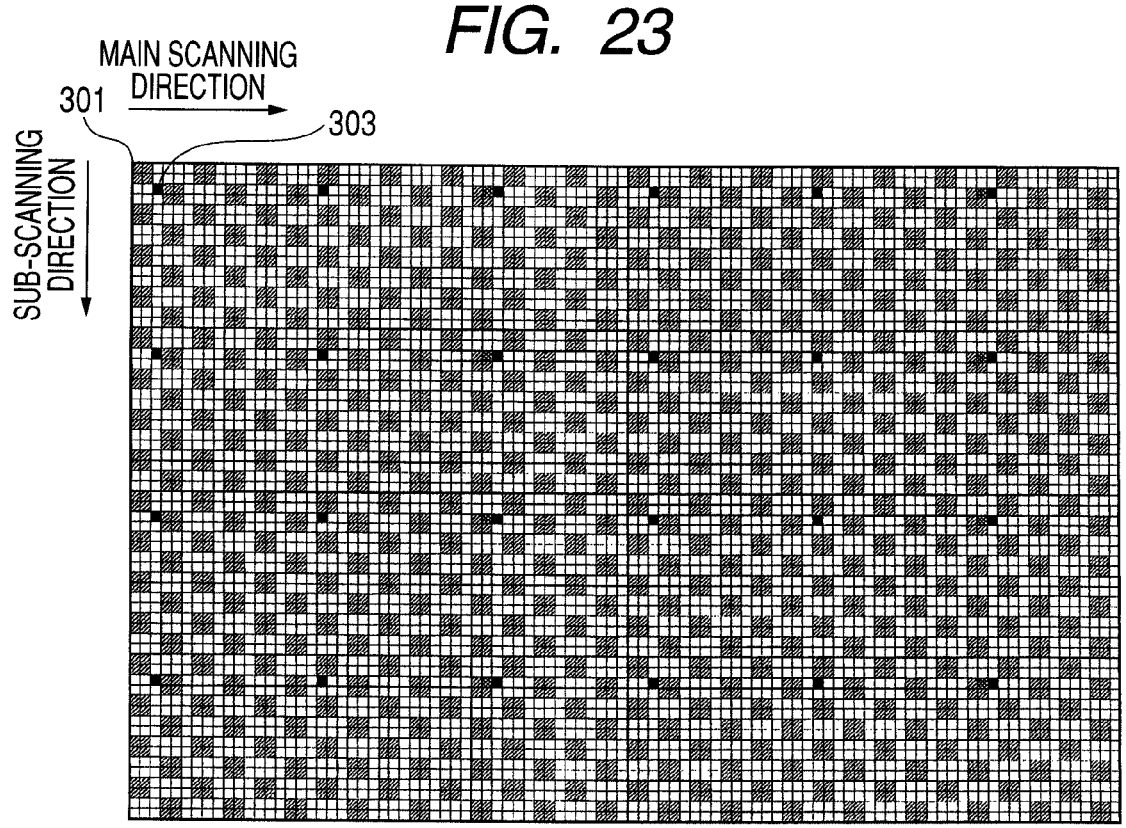
FIG. 23 illustrates a positional relationship between the add-on option positions and the halftone dots in the case of the dither B according to an embodiment.

FIG. 23 illustrates that the image area (FIG. 22) according to the least common multiple of the halftone processing period and the minimum interval of the add-on dots formed by the add-on signals 232 is widely developed. The unit of the image areas of FIG. 22 in FIG. 23 may also be called a first image area, a second image area, . . . and an Nth image area. As shown in FIG. 23, the positional relationship between the halftone dots and the add-on option positions periodically changes with the period of 48 pixels in the X direction and 16 pixels in the Y direction. All add-on option positions are arranged so as not to overlap the halftone dots (halftone dots corresponding up to a certain density). Thus, the arrangement allows to recognize the halftone dots and the add-on dots regardless of the add-on pattern.

In this case, it is guaranteed that the halftone dots and the add-on dots do not overlap or overlap within the allowable range in the image area according to the least common multiple value of FIG. 22. Therefore, the add-on control processing of the add-on signals started from the start position 303 of the add-on option positions can be continued for b and d within the range of 48 pixels×16 pixels illustrated in FIG. 22. The add-on control processing is continued through a, b, and d within 48 pixels in the X direction. However, unlike in the case of the dither A, the add-on control processing is not simply repeated through a, b, and d with the minimum interval of the add-on dots in the case of the dither B, because c is moved to d. In the case of the dither B, the add-on control processing is repeated at the period of 48 pixels that is the least common multiple of the halftone processing period and the minimum interval of the add-on dots in the X direction. Thus, the add-on option positions are arranged so as not to overlap the halftone dots.

In this way, the relationship between the halftone dots and the add-on option positions is also made appropriate in the case of the dither B. Therefore, a process similar to the add-on control processing for determining the add-on option position b of FIG. 22 can be continued for the next image area equivalent to the area in FIG. 22 that continues in the Y direction (the next image area will be called a second image area as opposed to the first image area of FIG. 22) within the range of the second image area. Add-on control processing similar to the add-on control processing for determining the add-on option positions a, b, and d of the first image area can be repeated with the period of 48 pixels not only in the Y direction, but also in the X direction. The add-on control processing of the add-on signals 232 herein is a generic term of part or all of the processing by the add-on option position calculated portion 224 (add-on control means) and the add-on signal generation portion 225 (add-on control means) described in FIG. 12A. More specifically, the add-on control processing is equivalent to part or all of the processing of the flow chart described in FIG. 12C.

Figure 24:
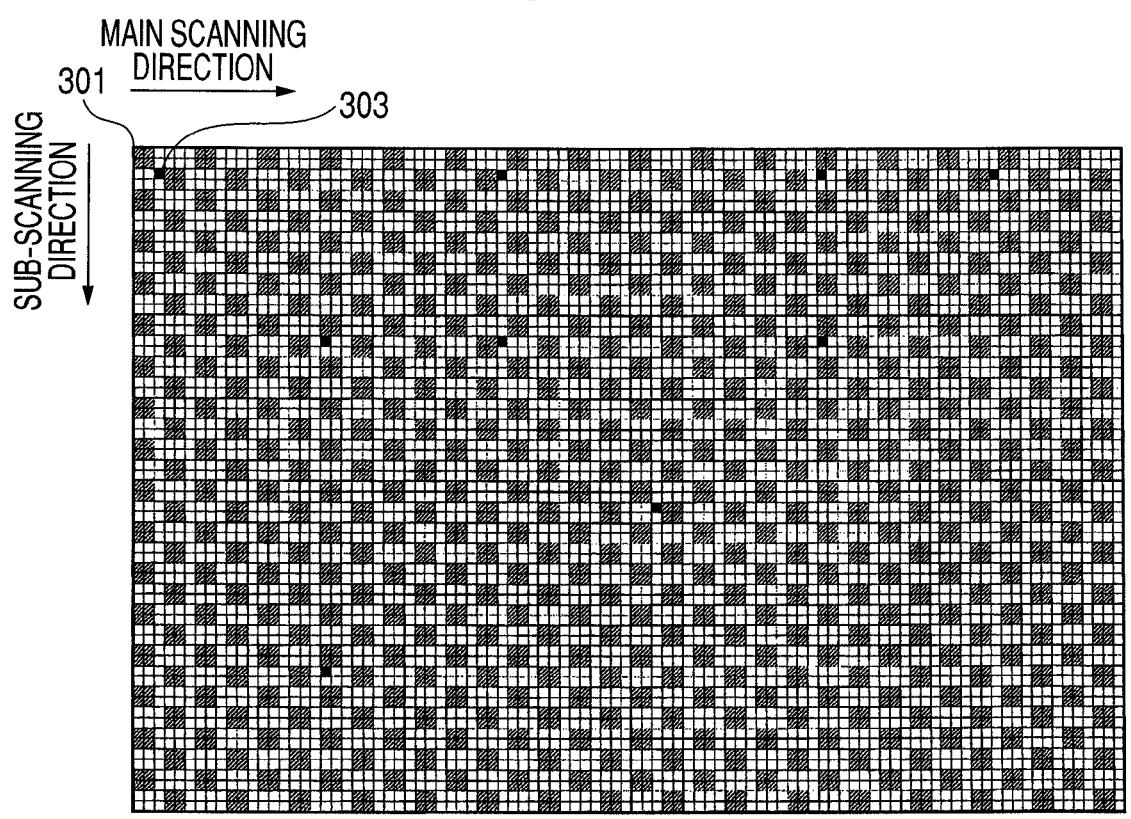
FIG. 24 illustrates a positional relationship between the add-on signals and the halftone dots in the case of the dither B according to an embodiment.

As an example, FIG. 24 illustrates add-on positions in which the add-on pattern illustrated in FIG. 10 is add-on to the add-on option positions illustrated in FIG. 23 by executing the add-on control processing described above. In FIG. 23, the blackened blocks indicate add-on dots (dots generated by the add-on signals) and are arranged at the positions that do not overlap the halftone dots. Even if the density is lower than in FIG. 8 (for example, FIGS. 6 and 7), the positions of the halftone dots and the add-on option positions or the add-on positions do not overlap.

In this way, even if the add-on dots cannot be recognized sufficiently just by making the start position 303 (P(0,0)) of the add-on option positions appropriate, the following can be performed to make the relationship appropriate. The add-on option position is moved, such as "from c to d", within the allowable value (α) of the deviation of the add-on option position. As a result, the relationship can be made appropriate without unnecessarily enlarging the add-on dot size.

An operation of the add-on option position calculated portion 224 for realizing the arrangement described above will now be described. In the case of the dither B, there are six add-on position parameters 230, Sx, Sy, Tx, Ty, ΔPx, and ΔPy, as position information for determining the relative position of the add-on signals and the halftone dots, and the parameters are recorded in the ROM 222. The add-on pattern signal 229 is illustrated with q of Table 1. Sx, Sy, Tx, Ty, ΔPx, and ΔPy as the add-on position parameters 230 are assumed as follows, and the processing will be described in order of (1) to (4) illustrated in FIG. 12A.

[Dither B]
Halftone processing reference position 301 Hx(=0), Hy(=0)
Start position 303 of add-on option positions Sx(=2), Sy(=2)
Add-on period Tx(=16), Ty(=16)
Add-on option position movement ΔPx(0)=0, ΔPy(0)=0
ΔPx(1)=0, ΔPy(1)=0
ΔPx(2)=1, ΔPy(2)=0
In this case, {ΔPx(0), ΔPx(1), ΔPx(2)} indicate movements of the add-on option positions a, b, and c in the main-scanning direction (X direction), respectively. In addition, {ΔPx(0), ΔPx(1), ΔPx(2)} indicate movements of the add-on option positions a, b, and c in the sub-scanning direction (Y direction), respectively (see FIG. 21 for the add-on option positions a, b, and c).

(1) The CPU 221 reads the add-on position parameters 230 (Sx, Sy, Tx, Ty, ΔPx, and ΔPy) from the ROM 222 and notifies the add-on position parameters 230 to the add-on option position calculated portion 224. Based on the notification, the add-on option position calculated portion 224 acquires the position information.

(2) The add-on option position calculated portion 224 calculates the add-on option positions P(0,0) to P(M,N) based on the add-on position parameters 230 with the following formula.

$$P(i,j)=(i\times Ty+Sy+\Delta Py(\text{MOD}(i,3))+Hy, j\times Tx+Sx+\Delta Px(\text{MOD}(i,3))+Hx)$$

In the values of the add-on option positions P(i,j), the first element (i×Ty+Sy+ΔPy(MOD(i,3))+Hy) corresponds to the counter value in the sub-scanning direction. The second element (j×Tx+Sx+ΔPx(MOD(i,3))+Hx) corresponds to the counter value in the main-scanning direction.

The following shows specific calculations.

$$P(0,0)=(0\times16+2+0+0, 0\times16+2+0+0)=(2,2)$$

$$P(0,1)=(0\times16+2+0+0, 1\times6+2+0+0)=(2,18)$$

$$P(0,2)=(0\times16+2+0+0, 2\times16+2+1+0)=(2,35)$$

$$P(0,3)=(0\times16+2+0+0, 3\times16+2+0+0)=(2,50)$$

$$P(0,4)=(0\times16+2+0+0, 4\times16+2+0+0)=(2,66)$$

$$P(0,5)=(0\times16+2+0+0, 5\times16+2+1+0)=(2,83)$$

. . .

$$P(1,0)=(1\times16+2+0+0, 0\times16+2+0+0)=(18,2)$$

$$P(1,1)=(1\times16+2+0+0, 1\times6+2+0+0)=(18,18)$$

. . .

$$P(M,N)=(M\times16+2+\Delta Py(\mathrm{MOD}(M,3))+0 \text{ (}x\text{ coordinate)},\\ N\times16+2+\Delta Px(\mathrm{MOD}(N,3))+0 \text{ (}y\text{ coordinate)})$$

(3) The add-on option position calculated portion 224 notifies the add-on option positions calculated in (2) to the add-on signal generation portion 225 as the add-on option position signals 231.

(4) The add-on signal generation portion 225 sets the add-on signals to 1 if the counter values of the main-scanning counter 226 and the sub-scanning counter 227 are determined to correspond to the add-on option position signals 231 and the corresponding add-on pattern signal 229 is 1. In other cases, the add-on signal generation portion 225 sets the add-on signals to 0. The add-on pattern signal corresponding to the add-on option positions P(i,j) refers to the value Q(i,j), or q(MOD(i,5),MOD(j,5)) as described above. The default value of the add-on signals is 0.

The main-scanning counter 226 and the sub-scanning counter 227 operate, and the position reaches the add-on option position P(0,0) when the counter value of the main-scanning counter 226=2 and the counter value of the sub-scanning counter 227=2. The bit value Q(0,0) corresponding to the add-on option position P(0,0) is checked. The add-on signal is set to 1, because the corresponding bit value is Q(0,0)=1(ON state). Thus, the add-on option position P(0,0) is an add-on position. If the counter value changes, the add-on signal is restored to 0.

The main-scanning counter 226 or the sub-scanning counter 227 further operates, and the position reaches the add-on option position P(0,1) when the counter value of the main-scanning counter 226=2 and the counter value of the sub-scanning counter 227=18. The bit value Q(0,1) corresponding to the add-on option position P(0,1) is checked. The add-on signal remains 0, because the corresponding bit value is Q(0,1)=0(OFF state). Thus, the add-on option position P(0,1) is not an add-on position.

Subsequently, similar operations are repeated until the position reaches the add-on option position P(M,N) at the image end.

In this way, the initial position is determined so that the halftone dots and the add-on signals do not overlap as a result of the halftone processing in the image area according to the least common multiple of the halftone processing period and the minimum interval of the add-on dots, and similar add-on control processing is repeated based on the initial position. Therefore, the load of the image forming apparatus can be reduced. More specifically, similar processing can be repeated in an image area according to the next least common multiple adjacent in the X and Y directions. Therefore, the load of analyzing the relationship between irregular halftone dots and add-on dots in each occasion as in conventional techniques can be reduced.

The processing of the present embodiment can be performed with the above configuration. Although the add-on dot is formed of one pixel in the present embodiment, the add-on dot may be formed of a plurality of pixels. Although six conditions (a) to (f) are met in the description of the present embodiment, the present invention can be effectively implemented by setting an optimal shape of the add-on dots or optimal movement of the add-on option positions according to the shape of the halftone dots, instead of limiting to the conditions.

The difference between the period of the halftone dots and the add-on period is not particularly considered in Japanese Patent Application Laid-Open No. 2001-103285 described in Description of the Related Art, and there are various relationships between the halftone dots and the add-on period. Under the circumstances, the relationship between the halftone dots (image data) and the add-on period needs to be first analyzed to specify the part to be off-dotted. The image data needs to be always referenced to execute the analysis and identification processing described above, resulting in a significant increase in the processing load. A memory needs to be retained for the analysis, which leads to an increased cost.

On the other hand, in the embodiment above, P(i,j) and Q(i,j) can be calculated if the add-on position parameters 230 can be acquired as described above. Therefore, the processing load can be reduced.

A second exemplary embodiment will be described as follows. The dot shape data is one pixel in the example of the first embodiment to simplify the description. However, the dot shape data is not limited to one pixel in view of obtaining the same effects as in the first embodiment.

The dot shape data denotes one or more add-on dots add-on according to the parts of the black circles in FIG. 10, but the dot shape data may include three dots, for example.

In that case, add-on signals equivalent to the three dots are add-on to the parts of the black circles of FIG. 10. More specifically, based on an add-on signal generated in step 407 of FIG. 12B described below, remaining two dots of add-on signals are allocated to surrounding pixels of the reference add-on signal and are generated at the same time in step S407.

How much the add-on dots (three dots) can overlap the halftone dots in the analysis of the tracking information by the analysis apparatus that analyzes the tracking information can be determined in the design phase when there are three dots of add-on signals add-on to the parts of the black circles. The allowable range can be determined based on the fact that the analysis apparatus that analyzes the tracking information can recognize the add-on dots at more than a predetermined rate. Tx, Ty, Sx, Sy, ΔPx, and ΔPy as the add-on position parameters 230 are then determined so that the halftone dots and the add-on dots overlap only within the determined allowable range. The add-on position parameters 230 are determined for each type of dithers, such as the dither A and the dither B. The determined add-on position parameters 230 are stored in the ROM 222 as predetermined parameters as in the first embodiment and are read according to the dither type designated in response to the notification from the controller 211 described in FIG. 2B. Based on the read add-on position parameters 230, the relative position of the add-on signals to the halftone dots is set so that the add-on signals add-on based on the add-on option positions do not overlap the halftone dots as a result of the halftone processing in the image area of the common multiple of the halftone processing period and the add-on period.

A third exemplary embodiment will be described as follows. The least common multiple of the halftone processing period and the add-on period (equivalent to the minimum interval of the add-on dots) is described in the above embodiments to prevent the add-on signals add-on by the signal add-on means based on the add-on period from overlapping the halftone dots as a result of the halftone processing. More specifically, an image area defined by the least common multiple of the dither period Dx and the add-on period Tx and the least common multiple of the dither period Dy and the add-on period Ty has been described both in the X direction and the Y direction. However, the arrangement is not limited to this in view of obtaining the same effects as in the above embodiments.

For example, the area illustrated in FIGS. 13 to 16 may be assumed based on the period twice as much as the least common multiple. Even in that case, the repeated use of the assumed area can control the memory consumption on some level and reduce the processing load on some level. The processing load can also be reduced as in the above embodiments. In this way, the add-on control processing may be continued or repeated in the image area according to the common multiple of the halftone processing period and the add-on period (equivalent to the minimum interval of the add-on dots) in the embodiments.

A fourth exemplary embodiment will be described as follows. Although examples of using the add-on option positions have been described in the above embodiments, the arrangement is not limited to this. For example, the add-on option positions may not be used if the add-on pattern illustrated in FIG. 11 is based on the integral multiple (common multiple) of the halftone processing periods in the X direction and the Y direction. In other words, the same effects as in the above embodiments can be obtained without using the add-on option positions.

In that case, the coordinates of a plurality of add-on dots constituting the first add-on add-on pattern corresponding to the dither patterns are stored in the ROM 222. The stored coordinates are equivalent to the add-on position parameters 230 described in the above embodiments. The coordinates of the add-on signals (add-on dots) to be add-on that are stored according to the types of dither are set as positions in which the add-on dots do not overlap the halftone dots in relation to the relative position relationship between the halftone dots and the add-on dots. Thus, the coordinate values of the add-on signals are set at the relative positions in which the halftone dots and the add-on dots do not overlap as much as possible.

The add-on option position calculated portion 224 acquires the coordinates, and the acquired position information (coordinates) are notified to the add-on signal generation portion 225. As in the processing of steps 410 and 411 of FIG. 12B, the add-on signal generation portion 225 executes an add-on control for adding the add-on signals when the sequentially incremented main-scanning counter 226 and the sub-scanning counter 227 match the counter values for adding the add-on dots.

After the first add-on pattern is add-on in the first image area, the period of the add-on pattern is added to the X coordinates and/or the Y coordinates of the add-on dots, and the added coordinates are used to execute similar add-on control processing to the next image area. The image area at this time is also compliant with the common multiple of the halftone processing period and the minimum interval of the add-on dots formed by the add-on signals.

In this way, the position information for determining the relative position of the halftone dots and the add-on signals to prevent the add-on signals from overlapping the halftone dots are acquired, and the add-on control processing of the add-on signals in the first image area based on the acquired position information (coordinates of the add-on pattern) is first executed. Similar add-on control processing can be continued or repeated in the adjacent image areas having the same size based on the coordinates obtained from the acquired position information. Therefore, the load of processing related to the add-on dots can be reduced.

Another exemplary embodiment will be described as follows. Although various embodiments have been described in detail, the present invention may also be applied to a system constituted by a plurality of devices or to an apparatus made of one device. Examples of the system and the apparatus include a printer, a facsimile, a PC, and a computer system including a server and a client.

The present invention can also be attained by directly or remotely supplying a software program for realizing the functions of the embodiments to a system or an apparatus and by the computer included in the system reading and executing the supplied program code.

Therefore, the program code installed in the computer also realizes the present invention for the computer to realize the functions and the processing of the present invention. Thus, the computer program for realizing the functions and the processing is one of the present invention.

In that case, the program can have any form, such as an object code, a program executed by an interpreter, and script data to be supplied to an OS, as long as the functions of the program are included.

Examples of a computer-readable recording medium for supplying the program include a flexible disk, a hard disk, an optical disk, a magneto-optical disk, an MO, a CD-ROM, a CD-R, and a CD-RW. Other examples of the recording medium are a magnetic tape, a non-volatile memory card, a ROM, and a DVD (DVD-ROM, DVD-R).

A browser of a client computer may also be used to download the program from a homepage of the Internet. Thus, the computer program of the present invention or a compressed file including an automatic installation function may be downloaded from the homepage to a recording medium such as a hard disk. The program code constituting the program of the present invention can be divided into a plurality of files, and the files can be downloaded from different homepages to realize the program. Thus, the WWW server for a plurality of users to download the program files for the computer to realize the functions and processing of the present invention is a constituent element of the present invention in some cases.

The program of the present invention may also be encrypted and stored in a storage medium such as a CD-ROM and distributed to the user. Only the users who have met predetermined conditions may be allowed to download key information for removing the encryption from the homepage through the Internet to decode the encrypted program with the key information to execute the program, thereby installing the program on the computer.

The computer may execute the read program to realize the functions of the embodiments. An OS operated on the computer may execute part or all of the actual processing based on an instruction of the program. Obviously, the functions of the embodiments can also be realized in this case.

Furthermore, the program read from the recording medium may be written into a memory included in a function expansion board inserted to the computer or a function expansion unit connected to the computer. A CPU included in the function expansion board or the function expansion unit may execute part or all of the actual processing based on the instruction of the program. The functions of the embodiments may be realized in this way.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-135609, filed May 23, 2008, which is hereby incorporated by reference herein in its entirety.

What is claimed is:

1. An image forming apparatus that forms an image on a recording medium, based on image signals on which add-on signals are added, the add-on signals being adapted to form add-on dots read by an analysis device that analyzes tracking information, comprising:
   a halftone processing section that converts an input image signal to a halftone processing image signal having a halftone processing cycle;
   a signal add-on section that adds the add-on signals on the halftone processing image signal;
   a control section that acquires position information to determine a relative position of an image formed according to the halftone processing image signal and add-on dots formed according to the add-on signals in a first image area among plural image areas defined in accordance with common multiples between a halftone processing cycle of the halftone processing image signal and a minimum interval among the add-on dots formed according to the add-on signals without overlapping the image formed according to the halftone processing image signal and the add-on dots formed according to the add-on signals,
   wherein the control section acquires other position information to determine a relative position of an image formed according to the halftone processing image signal and add-on dots formed according to the add-on signals in a second image area, based on the position information acquired in the first image area.

2. An image forming apparatus according to claim 1, wherein the control section comprises a determining section that determines whether to add the add-on signals to add-on option positions of the add-on signals based on the position information and a predetermined period, the position information being for determining the relative position of the halftone processing image signal and the add-on signals, and
   the control section causes the signal add-on section to add the add-on signals when the determining section determines to add the add-on signals.

3. An image forming apparatus according to claim 2, comprising a judging section that judges whether the add-on option position is a specific position among the positions based on the position information and the predetermined period, wherein the control section sets the add-on option position to a position moved from the specific position when the judging section judges that the add-on option position is the specific position.

4. An image forming apparatus according to claim 3, wherein the common multiple is a least common multiple.

5. An image forming apparatus according to claim 2, wherein the common multiple is a least common multiple.

6. An image forming apparatus according to claim 1, wherein said halftone processing section can execute a plurality of different halftone processing methods according to the attributes of an image corresponding to the image signals, and
   said control section acquires position information for determining a relative position of the halftone processing image signal and the add-on signals according to the plurality of different halftone processing methods executable by said halftone processing section.

7. An image forming apparatus according to claim 6, wherein the attributes of the image are notified from a controller that is a supplier of the image signals.

8. An image forming apparatus according to claim 7, wherein the common multiple is a least common multiple.

9. An image forming apparatus according to claim 6, wherein the common multiple is a least common multiple.

10. An image forming apparatus according to claim 1, wherein the common multiple is a least common multiple.

11. An image forming apparatus according to claim 1, position at which the add-on dot is formed is changed by the position information without overlapping images formed according to the halftone processing signal.

12. An image forming method in an image forming apparatus that forms an image on a recording medium, based on image signals on which add-on signals are added, wherein the add-on signals being adapted to form add-on dots read by an analysis device that analyzes tracking information, comprising steps of:
    converting an input image signal to a halftone processing image signal having a halftone processing cycle;
    adding the add-on signals on the halftone processing image signal;
    acquiring position information to determine a relative position of an image formed according to the halftone processing image signal and add-on dots formed according to the add-on signals in a first image area, among plural image areas defined in accordance with common multiples between a halftone processing cycle of the halftone processing image signal and a minimum interval among the add-on dots formed according to the add-on signals without overlapping the image formed according to the halftone processing image signal and the add-on dots formed according to the add-on signals,
    wherein the acquiring position information including acquiring other position information to determine a relative position of an image formed according to the halftone processing image signal and add-on dots formed according to the add-on signals in a second image area, based on the position information acquired in the first image area.

13. A non-transitory computer-readable storage medium storing a program executable in a computer, for executing the method according to claim 12.

* * * * *